(12) United States Patent
Kuroyama et al.

(10) Patent No.: US 9,683,304 B2
(45) Date of Patent: Jun. 20, 2017

(54) RESIN-METAL BONDED BODY AND METHOD FOR PRODUCING THE SAME

(71) Applicant: TOADENKA CORPORATION, Morioka-shi, Iwate (JP)

(72) Inventors: Masumi Kuroyama, Kariya (JP); Tomonori Ishikawa, Kariya (JP); Kazuo Kato, Kariya (JP); Yaeko Sasaki, Morioka (JP); Shuhei Miura, Morioka (JP); Masayuki Nakamura, Morioka (JP); Setsuko Sato, Morioka (JP)

(73) Assignee: Toadenka Corporation, Morioka-shi (JP)

( * ) Notice: Subject to any disclaimer, the term of this patent is extended or adjusted under 35 U.S.C. 154(b) by 0 days.

(21) Appl. No.: 14/133,420

(22) Filed: Dec. 18, 2013

(65) Prior Publication Data
US 2014/0102908 A1    Apr. 17, 2014

Related U.S. Application Data

(62) Division of application No. 12/733,243, filed as application No. PCT/JP2008/072767 on Dec. 15, 2008, now abandoned.

(30) Foreign Application Priority Data

Dec. 14, 2007    (JP) .................................. 2007-323221

(51) Int. Cl.
*C25D 5/48*    (2006.01)
*C25D 11/04*    (2006.01)
(Continued)

(52) U.S. Cl.
CPC .......... *C25D 5/48* (2013.01); *B29C 45/14311* (2013.01); *B29C 45/14778* (2013.01);
(Continued)

(58) Field of Classification Search
CPC ....................................................... C25D 5/48
(Continued)

(56) References Cited

U.S. PATENT DOCUMENTS 2,085,002 A    6/1937    Buzzard
3,414,489 A *  12/1968   Rogers ......................... 205/203
(Continued)

FOREIGN PATENT DOCUMENTS

CN    1329987 A    1/2002
JP    53-111380    9/1978
(Continued)

OTHER PUBLICATIONS

Sulka, G.D., "Nanostructure Materials in Electrochemistry", Ch. 1, p. 1-116, 2008, Wiley-VCH.*
(Continued)

*Primary Examiner* — Stefanie S Wittenberg
(74) *Attorney, Agent, or Firm* — Taft Stettinius & Hollister LLP

(57) ABSTRACT

Disclosed is a resin-metal bonded body of an aluminum metal member and a thermoplastic resin member, which has improved bonding strength and good durability. Also disclosed is a method for producing such a resin-metal bonded body. Specifically disclosed is a resin-metal bonded body which is obtained by bonding an aluminum metal member with a thermoplastic resin member. In this resin-metal bonded body, the aluminum metal member and the thermoplastic resin member are bonded together by an anodic oxide coating having a film thickness of 70-1500 nm or an anodic oxide coating having a triazine thiol in the inner and upper portions. The anodic oxide coating has an infrared absorption spectrum peak intensity ascribed to OH group at 0.0001-0.16.

1 Claim, 25 Drawing Sheets

(51) Int. Cl.
*C25D 11/18* (2006.01)
*C25D 11/20* (2006.01)
*B29C 45/14* (2006.01)
*B29K 705/00* (2006.01)
*B29K 705/02* (2006.01)

(52) U.S. Cl.
CPC .............. *C25D 11/04* (2013.01); *C25D 11/18* (2013.01); *C25D 11/20* (2013.01); *B29K 2705/00* (2013.01); *B29K 2705/02* (2013.01); *Y10T 428/269* (2015.01)

(58) Field of Classification Search
USPC ........................................................ 205/222
See application file for complete search history.

(56) References Cited

U.S. PATENT DOCUMENTS

| | | | |
|---|---|---|---|
| 5,608,267 A * | 3/1997 | Mahulikar | ............ H01L 23/315 257/706 |
| 5,900,295 A * | 5/1999 | Kawada | ........................ 428/36.9 |
| 6,099,953 A | 8/2000 | Komai et al. | |
| 2002/0098288 A1 | 7/2002 | Kamitani | |
| 2004/0041046 A1* | 3/2004 | Nishimura | .................... 242/310 |
| 2004/0244897 A1 | 12/2004 | Hotaka et al. | |
| 2005/0032596 A1 | 2/2005 | Nonoshita et al. | |

FOREIGN PATENT DOCUMENTS

| | | | | |
|---|---|---|---|---|
| JP | 5-51671 B | 8/1993 | | |
| JP | 2001-200374 A | 7/2001 | | |
| JP | 2002-19015 A | 1/2002 | | |
| JP | 2004-82612 A | 3/2004 | | |
| JP | 2004-243729 A | 9/2004 | | |
| JP | 2005-205056 A | 8/2005 | | |
| KR | 1020080062814 | * | 7/2008 | ............. B29C 45/14 |
| WO | 97/35716 A1 | 10/1997 | | |

OTHER PUBLICATIONS

Ebihara, K., et al., "Structure and Density of Anodic Oxide Films Formed on Aluminum in Sulfuric Acid Solutions", Journal of the Metal Finishing Society of Japan, vol. 33, 1982, No. 4, p. 156-164.*
Mori et al., "Adhesion of Nylon-6 to Triazine Trithiol-Treated Metals during Injection Molding," Journal of Adhesion Science Technology, vol. 14, No. 6 (2000), pp. 791-803.
Tomsic et al., Dictionary of Materials and Testing, 2nd Ed., Society of Automotive Engineers, Inc., 2000, p. 25.
Zhong et al., "Protective Diffusion Coatings on Magnesium Alloys: a Review of Recent Developments," Journal of Alloys and Compounds, 520 (2012), pp. 11-21.

* cited by examiner

RESIN-METAL BONDED BODY AND METHOD FOR PRODUCING THE SAME

This application is a division of U.S. patent application Ser. No. 12/733,243 having a filing date of Jun. 15, 2010, which was a national stage application of PCT/JP2008/072767 filed Dec. 15, 2008, and claims priority of Japan Patent Application No. 2007-323221 filed Dec. 14, 2007. The contents of said: U.S. patent application Ser. No. 12/733,243 having a filing date of Jun. 15, 2010; international application PCT/JP2008/072767 filed Dec. 15, 2008; and Japan Patent Application No. 2007-323221 filed Dec. 14, 2007, all are incorporated herein by reference. The present invention relates to a resin-metal bonded body of an aluminum metal member and a thermoplastic resin member and a method for producing the same, and in particular, to a resin-metal bonded body obtained by bonding an aluminum metal member with a thermoplastic resin member using an anodic oxide coating as a bonding film and a method for producing the same.

TECHNICAL FIELD

Background Technology

In recent years, a reduction in weight has been demanded in various fields, such as home electronics, cellular phones, automobile parts, personal computers and electronic parts.

As for these members of which a reduction in weight has been required, the used metal members are being replaced with resin members.

However, it is difficult to replace the metal members with resin members for the parts that require properties specific to metal, such as high conductivity and heat conductance. Accordingly, bonded bodies of a metal member and a resin member have been examined such that the metal member is applied for the part that requires the above described properties and the resin member is applied for the part that does not require the above described properties in order to reduce the weight.

Conventional methods for producing a bonded body of an aluminum metal member and a resin member include a method for bonding an aluminum metal member with a resin member using an adhesive and a method for bonding an aluminum metal member with a resin through insert molding or outsert molding where an aluminum metal member is set within a mold into which a molten resin is directly injected.

The resin-metal bonded bodies produced according to these conventional methods have such defects that the strength of bonding in the interface between the aluminum metal member and the resin member decreases greatly when left in a high temperature, high humidity environment or when heat is applied.

Meanwhile, Japanese Examined Patent Publication H5 (1993)-51671 (Patent Document 1) discloses an electrochemical surface treating method on the surface of a metal according to which a coating of triazine thiol is formed on the surface of the metal member through electrodeposition, and a complex made by using this method.

In addition, Japanese Unexamined Patent Publication 2001-200374 (Patent Document 2) discloses a reactivity holding method on the surface of a metal for holding the reactivity of a triazine trithiol metal salt formed on the surface of a metal as a coating by making the triazine trithiol metal salt formed as a coating on the surface of a metal react to or adsorb a reactive compound that can be negatively charged.

In addition, the Japanese Translation of International Unexamined Patent Publication WO97/35716 (Patent Document 3) describes a thermoplastic resin coating aluminum alloy where an aluminum alloy plate is anodically oxidized so that an anodically oxidized coating having a film thickness of 20 nm or less is formed and a thermoplastic resin coating is layered and adhered to the surface of the anodically oxidized plate, that is to say, a thermoplastic resin formed on an aluminum metal member as a coating.

However, these resin-metal bonded bodies have problems with the strength in the interface of the bonding, which is not sufficient for bonding the aluminum metal member with the resin member, and with the durability, which is insufficient such that the adhesiveness deteriorates and causes peeling, when used.

Patent Document 1: Japanese Examined Patent Publication H5 (1993)-51671

Patent Document 2: Japanese Unexamined Patent Publication 2001-200374

Patent Document 3: Japanese Translation of International Unexamined Patent Publication WO97/35716

DISCLOSURE OF THE INVENTION

Problem to be Solved by the Invention

The present invention is provided in view of the above described problems with the prior art and provides a resin-metal bonded body of an aluminum metal member and a thermoplastic resin member, which has improved bonding strength and good durability, as well as a method for producing the same.

Means for Solving Problem

The present invention is provided in order to achieve the above described object and is based on the findings that resin-metal bonded bodies have improved bonding strength and good durability when a particular anodic oxide coating is provided between the aluminum metal member and the thermoplastic resin member.

In addition, the present invention is based on the findings that a compound can be produced as a resin-metal bonded body of an aluminum metal member and a thermoplastic resin member having improved bonding strength and good durability when an aluminum metal member is anodically electrolyzed in an acid solution under certain conditions so that an anodic oxide coating is formed and/or an aluminum metal member is anodically electrolyzed or immersion treatment is carried out on an aluminum metal member in a solution containing a triazine dithiol derivative so that a triazine dithiol derivative is provided with the anodic oxide coating in the inner or upper portions, and then the above described thermoplastic resin is bonded with the aluminum metal member on which the coating is formed.

The first resin-metal bonded body according to the present invention is a resin-metal bonded body of an aluminum metal member and a thermoplastic resin member, characterized in that the above described aluminum metal member and thermoplastic resin member are bonded together by an anodic oxide coating having a film thickness of 70-1500 nm, and the anodic oxide coating has an infrared absorption spectrum peak intensity ascribed to the OH group at 0.0001-0.16.

The second resin-metal bonded body according to the present invention is a resin-metal bonded body of an aluminum metal member and a thermoplastic resin member, characterized in that the above described aluminum metal member and thermoplastic resin member are bonded together by an anodic oxide coating having triazine thiol with a film thickness of 70-1500 nm in the inner and upper portions, and the anodic oxide coating has an infrared absorption spectrum peak intensity ascribed to the OH group at 0.0001-0.16.

In addition, the method for producing the above described first resin-metal bonded body according to the present invention is a method for producing the above described first resin-metal bonded body, characterized by having; the anodic oxidation step of forming an anodic oxide coating having a film thickness of 70-1500 nm on an aluminum metal member through electrolysis with a current density of 0.02 A/dm$^2$ and less than 2.5 A/dm$^2$ in an acid solution at 35-90° C. using the aluminum metal member as an anode; the water washing step of washing the aluminum metal member on which the anodic oxide coating is formed with water at a temperature of 5° C. or higher and less than 60° C.; and the step of insert molding a thermoplastic resin on the aluminum metal member on which the anodic oxide coating is formed after being washed with water, so that the above described aluminum metal member and the thermoplastic resin are bonded together.

In addition, the method for producing the above described second resin-metal bonded body according to the present invention is a method for producing the above described second resin-metal bonded body, characterized by having: the anodic oxidation step of forming an anodic oxide coating having a film thickness of 70-1500 nm on an aluminum metal member through electrolysis with a current density of 0.02 A/dm$^2$ and less than 2.5 A/dm$^2$ in an acid solution at 35-90° C. using the aluminum metal member as an anode; the electrolytic polymerization step of providing a triazine thiol derivative with the inner and upper portions of the anodic oxide coating through electrolysis of the aluminum metal member having the anodic oxide coating as an anode in an aqueous solution containing a triazine thiol derivative; the water washing step of washing the aluminum metal member having triazine thiol on which the anodic oxide coating is formed with water at a temperature of 5° C. or higher and less than 60° C.; and the step of insert molding a thermoplastic resin on the aluminum metal member having triazine thiol on which the anodic oxide coating is formed after being washed with water, so that the above described aluminum metal member and the thermoplastic resin are bonded together.

In addition, another method for producing the above described second resin-metal bonded body according to the present invention is a method for producing the second resin-metal bonded body, characterized by having: the step of forming an anodic oxide coating having a film thickness of 70-1500 nm and a triazine thiol derivative in the inner and upper portions on an aluminum metal member through electrolysis with a current density of 0.02 A/dm$^2$ or higher and less than 2.5 A/dm$^2$ in an acid solution containing a triazine thiol derivative at 35-90° C. using the aluminum metal member as the anode; the water washing step of washing the aluminum metal member having triazine thiol on which the anodic oxide coating is formed with water at a temperature of 5° C. or higher and less than 60° C.; and the step of insert molding a thermoplastic resin on the aluminum metal member having triazine thiol on which the anodic oxide coating is formed after being washed with water, so that the above described aluminum metal member and the thermoplastic resin are bonded together.

In addition, still another method for producing the above described second resin-metal bonded body is a method for producing the second resin-metal bonded body, characterized by having: the anodic oxidation step of forming an anodic oxide coating having a film thickness of 70-1500 nm on an aluminum metal member through electrolysis with a current density of 0.02 A/dm$^2$ or higher and less than 2.5 A/dm$^2$ in an acid solution at 35-90° C. using the aluminum metal member as the anode; the immersion step of immersing the aluminum metal member on which the anodic oxide coating is formed in a solution containing a triazine thiol derivative so that a triazine thiol derivative is provided with the inner and upper portions of the anodic oxide coating; the water washing step of washing the aluminum metal member having triazine thiol on which the anodic oxide coating is formed with water at a temperature of 5° C. or higher and less than 60° C.; and the step of insert molding a thermoplastic resin on the aluminum metal member having triazine thiol on which the anodic oxide coating is formed after being washed with water, so that the above described aluminum metal member and the thermoplastic resin are bonded together.

Effects of the Invention

The first resin-metal bonded body according to the present invention can provide a strong bond between the aluminum metal member and the thermoplastic resin member, and thus, has such excellent durability that the aluminum metal member and the thermoplastic resin member do not peel or separate and the high strength can be maintained over a long period of time even when used in a severe environment.

Furthermore, the bonding is stronger such that the first resin-metal bonded body has excellent resistance to acid corrosion when the peak intensity of the infrared absorption spectrum ascribed to the OH group is at 0.0001-0.16.

In addition to the above described effects, the second resin-metal bonded body according to the present invention has a stronger bond between the aluminum metal member and the thermoplastic resin member and excellent durability when a triazine thiol derivative is provided with the inner and upper portions of the anodic oxide coating formed on the aluminum metal member.

In addition, the method for producing the resin-metal bonded body according to the present invention allows the above described resin-metal bonded body according to the present invention to be produced efficiently.

The above described anodic oxide coating makes the adhesiveness between the metal member and the thermoplastic member stronger during the above described anodic oxidation step. In addition, it is possible to further enhance the strength by providing triazine thiol with the gained anodic oxide coating.

That is to say, in addition to the bonding strength due to the anchoring effects between the anodic oxide coating and the thermoplastic resin, the reaction between the aluminum metal, triazine and the thermoplastic resin can make the bond between the aluminum metal member and the thermoplastic resin even stronger.

In particular, the method according to Claim 5 can form the anodic oxide coating and provide triazine thiol at the same time, and therefore, the resin-metal bonded body according to the present invention can be produced in accordance with an easy method.

In particular, the methods according to Claims 4 and 6 can increase the amount of triazine thiol provided in the anodic oxide coating.

In particular, the method for producing the resin-metal bonded body according to Claim 6 including the immersion step makes it possible to easily provide triazine thiol with the anodic oxide coating.

EXPLANATION OF SYMBOLS

Figure 1:
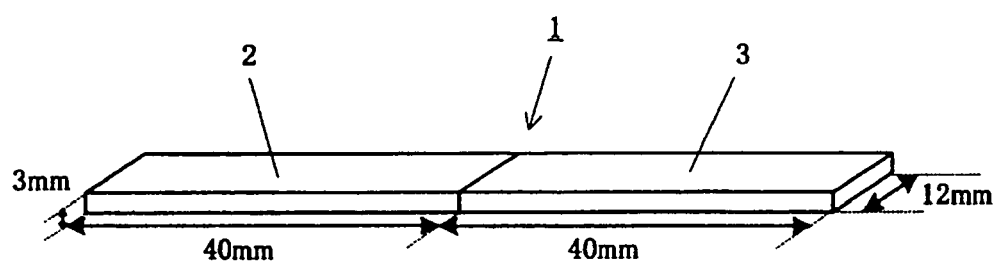
FIG. 1 is a schematic diagram showing an example of a resin-metal bonded body.

1 . . . resin-metal bonded body
2 . . . aluminum metal member
3 . . . resin member
4 . . . anodic oxide coating
5 . . . triazine thiol derivative

BEST MODE FOR CARRYING OUT THE INVENTION

The present invention is described on the basis of the following best modes, but the invention is not limited to these.

The first resin-metal bonded body according to the present invention is a resin-metal bonded body of an aluminum metal member and a thermoplastic resin member, wherein the above described aluminum metal member and thermoplastic resin member are bonded together by an anodic oxide coating having a film thickness of 70-1500 nm, preferably 100-1000 nm, and the anodic oxide coating has an infrared absorption spectrum peak intensity ascribed to the OH group at 0.0001-0.16.

The second resin-metal bonded body according to the present invention is a resin-metal bonded body of an aluminum metal member and a thermoplastic resin member, wherein the above described aluminum metal member and thermoplastic resin member are bonded together by an anodic oxide coating having triazine thiol with a film thickness of 70-1500 nm, preferably 100-1000 nm, in the inner and upper portions, and the anodic oxide coating has an infrared absorption spectrum peak intensity ascribed to the OH group at 0.0001-0.16.

Any aluminum based metal member made of an aluminum alloy, for example an Al—Mg based alloy or an Al—Zn—Mg based alloy can be used as the aluminum metal member for the resin-metal bonded body according to the present invention, in addition to aluminum metal members made of pure aluminum.

Polyethylene, polypropylene, polyvinyl chloride, polyvinyl acetate, polyacrylate, polymethacrylate, unsaturated polyester, polyester, polyamide, polyether, polyurethane elastomers, polystyrene, polysulfone, polyethersulfone, polyarylate, polyacetal, polyethylene terephthalate, polycarbonate, polyphenylene ether, polyphenylene oxide, polyphenylene sulfide, polybutadiene, polybutylene terephthalate, polymethyl pentane, liquid crystal polymers and alloys can be cited as examples of thermoplastic resins for forming the thermoplastic resin member bonded with an aluminum metal member for use in the resin-metal bonded body according to the present invention.

In addition, a glass filler, a carbon filler, metal whiskers, calcium carbonate, a bulking agent, a pigment, a stabilizer or the like may be added to the thermoplastic resin.

In particular, triazine dithiol derivatives into which a polar group that reacts with the R group in the below described formula (1) is introduced in a terminal group of the resin, for example polyphenylene sulfide into which an amino group or an epoxy group is introduced in a terminal group, are also appropriate for the thermoplastic resin that can be used in the second resin-metal bonded body according to the present invention, in addition to the above cited thermoplastic resins.

In addition, an elastomer having a polar group that reacts with the R group in the below described formula (1) in the triazine dithiol derivative can be added.

In the case of polyphenylene sulfide, for example, it is also possible to add a polyethylene based copolymer gained by graft copolymerizing unsaturated carbonic acid or a derivative thereof (for example maleic anhydride), a polyalkylene glycol copolymer where the terminal group is an amino group (for example polyethylene glycol having an amino group as a terminal end), an α-olefin copolymer (for example ethylene) gained by copolymerizing an epoxy compound (for example N-[4-(2,3-epoxypropoxy)-3,5-dimethylbenzyl]acrylamide), a maleic anhydride modified polyethylene copolymer, or a multifunctional block type isocyanate (for example 4,4'-diphenylmethane diisocyanate).

The above described aluminum metal member and thermoplastic resin member are bonded together by means of the anodic oxide coating formed on the aluminum metal member through anodic oxidation.

The anodic oxide coating has a film thickness of 70-1500 nm, preferably 100-1000 nm. Such a film thickness makes the bond between the aluminum metal member and thermoplastic resin member stronger, and thus the bond is highly durable.

In the case where the film thickness is less than 70 nm, the anodic oxide coating on the aluminum metal member is thin, and therefore, the layer bonded with the thermoplastic resin is thin, and in addition, the coating is not likely to be dense and uniform, and therefore, the bond is not strong enough. Meanwhile, in the case where the film thickness exceeds 1500 nm, the bonding layer can be secured between the anodic oxide coating and the thermoplastic resin, but the anodic oxide coating layer is too thick to prevent the coating from breaking internally.

Here, "film thickness" as used in the present invention is described.

As concerns measurement of the film thickness, first the gained resin-metal bonded body is cut to a thickness of approximately 100 nm using a microtome (product number Ultracut S, made by LEICA aktiengesellschaft), so that the film thickness of the coating on the bonding surface between the aluminum metal member and the thermoplastic resin can be measured, and thus samples for measurement are fabricated.

Next, the cross section along the bonded interface between the aluminum metal member and the thermoplastic resin of each sample for measurement is observed through a TEM (transmission electron microscope; product number H-N 800 Electron Microscope, made by JOEL Ltd.), and the average value taken for the measurements for the distance between the upper end of the anodic oxide coating and the border surface between the aluminum metal member and the thermoplastic resin from ×20,000 photographs.

In addition, too much OH group on the anodic oxide coating on the aluminum metal member makes the coating fragile, and also makes it easy for the bonded portion to break when bonded with the thermoplastic resin.

Accordingly, in the present invention, the infrared absorption spectrum peak intensity ascribed to the OH group in the anodic oxide coating formed on the aluminum metal member is 0.0001-0.16, preferably 0.005-0.07.

Thus, the bond between the aluminum metal member and the thermoplastic resin member is very strong and durable when the amount of OH group in the coating is within the above described range.

Furthermore, it is possible for the bond to have excellent resistance to acid corrosion.

Here, in the present invention, the infrared absorption spectrum peak intensity ascribed to the OH group exhibits the value of 4000-3000 $cm^{-1}$ as measured using a Fourier conversion infrared spectrometer (product number JIR-WINSPEC 100, made by JOEL Ltd.) under such the conditions that the measurement mode is a highly sensitive reflection method, the detector is MCT, the resolution is 4 $cm^{-1}$, the number of additions is 100, the measured range is 4000-400 $cm^{-1}$.

Thus, a particular anodic oxide coating is provided between the aluminum metal member and the thermoplastic resin member, so that anchor bonds are formed due to the roughness on the above described anodic oxide coating on the bonding interface between the aluminum metal member and the thermoplastic resin member, where a sufficiently strong bind is not gained according to the prior art, and thus, the anodic oxide coating and the thermoplastic resin can be bonded firmly together.

Furthermore, $Al_2O_3$ in the coating on the thermoplastic resin side and the main skeleton of the thermoplastic resin form acid-base bonds in the bonding interface between the above described anodic oxide coating and thermoplastic resin, so that the coating and the thermoplastic resin are firmly bonded together.

As concerns the anodic oxide coating in the resin-metal bonded body according to the present invention, the ratio of the black area is 50-70%, preferably 50-60%, in the scanning electron microscope (SEM) photographs.

Here, the black portions can be considered to correspond to the roughness on the surface of the coating.

It is assumed that the thermoplastic resin member provides an anchor bond with the roughness on the surface of the anodic oxide coating in the aluminum metal member so as to enhance the strength of adhesion when the ratio of black portions (possibly recess portions) is within this range.

Here, the ratio of the black area in the SEM photographs of the anodic oxide coating is the value gained by calculating the ratio of the area of black portions to the total area when the surface of the anodic oxide coating on the surface of the aluminum metal member is observed through an SEM (scanning electron microscope, product number JSM-6701F, made by JOEL Ltd.) at a magnification of 200,000 times, and the brightness of the thus gained image is adjusted using Photoshop (made by Adobe Systems Incorporated), so that the threshold value becomes 140 in analySIS FIVE (made by Olympus Corporation), and after that portions where brightness is lower than the threshold value in the above described analySIS FIVE are converted to black and portions where the brightness is the same as the threshold value or higher are converted to white.

In particular, a triazine thiol derivative is provided in the upper and inner portions of the above described anodic oxide coating in the second resin-metal bonded body according to the present invention.

The triazine thiol derivative may be a coating on the anodic oxide coating, or provided over part of the anodic oxide coating, and thus, there are no specific limitations to the manner in which it is provided.

The triazine thiol derivative represented in the following general formula (1) is an example of the triazine thiol derivative.

[Chemical formula 1]

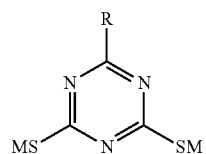

(1)

Here, in the above general formula (1), R is —SM, —OR$^1$, —SR$^1$, —NHR$^1$, —N(R$^1$)$_2$, R$^1$ is an alkyl group, an alkenyl group, a phenyl group, a phenyl alkyl group, an alkyl phenyl group or a cycloalkyl group, M is H, Na, Li, K, ½Ba, ½Ca, aliphatic primary, secondary or tertiary amine, or a quaternary ammonium salt. Here, the two M's in the above general formula may be the same or different.

In addition, Triazine thiol derivative salts, such as 1,3,5-triazine-2,4,6-trithiol (TT), 1,3,5-triazine-2,4,6-trithiol monosodium (TTM), 1,3,5-triazine-2,4,6-trithiol triethanolamine (F-TEA), 6-anilino-1,3,5-triazine-2,4-dithiol (AF), 6-anylino-1,3,5-triazine-2,4-dithiol monosodium (AFN), 6-dibutylamino-1,3,5-triazine-2,4-dithiol (DB), 6-dibutylamino-1,3,5-triazine-2,4-dithiol monosodium (DBN), 6-diallylamino-1,3,5-triazine-2,4-dithiol (DA), 6-diallylamino-1,3,5-triazine-2,4-dithiol monosodium (DAN), 1,3,5-triazine-2,4,6-trithiol di(tetrabutylammonium salt) (F2A), 6-dibutylamino-1,3,5-triazine-2,4-dithiol tetrabutylammonium salt (DBA), 6-dithioctylamino-1,3,5-triazine-2,4-dithiol (DO), 6-dithioctylamino-1,3,5-triazine-2,4-dithiol monosodium (DON), 6-dilaurylamino-1,3,5-triazine-2,4-dithiol (DL), 6-dilaurylamino-1,3,5-triazine-2,4-dithiol monosodium (DLN), 6-stearylamino-1,3,5-triazine-2,4-dithiol (ST), 6-stearylamino-1,3,5-triazine-2,4-dithiol monopotassium (STK), 6-oleilamino-1,3,5-triazine-2,4-dithiol (DL) and 6-oleilamino-1,3,5-triazine-2,4-dithiol monopotassium (OLK) can be cited as concrete examples of triazine thiol derivatives that can be represented by the above general formula (1).

When a triazine thiol derivative is provided in the upper and inner portions of the anodic oxide coating formed on the aluminum metal member, the bond is stronger and more durable than the first resin-metal bonded body according to the present invention, where the aluminum metal member and the thermoplastic resin member are bonded together only by means of an anodic oxide coating.

When a triazine thiol derivative is provided, a chemical bond of Al—S is formed between the Al in the aluminum metal member and the triazine thiol derivative, in addition to the above described anchor bond and acid-base bond, and in addition, a covalent bond is formed between the triazine thiol derivative and the terminal functional group in the thermoplastic resin, and moreover, an anchor bond is formed between the triazine thiol derivative and the thermoplastic resin, due to the roughness on the surface of the two, and thus, the bond is extremely strong and highly durable.

In addition, part of the anodic oxide coating provided with a triazine thiol derivative includes a polymer of the triazine thiol derivative and SO$_4$, which is the deteriorated structure of the triazine thiol derivative, in addition to a triazine thiol aluminum salt because of the triazine thiol derivative and the aluminum oxide.

In addition, it is desirable for the surface of the above described anodic oxide coating on the above described thermoplastic resin side in the resin-metal bonded body according to the present invention to be rough, preferably rough to a depth of 5-100 nm.

This is because this allows a bond having an anchor structure to be formed between the above described coating and the above described thermoplastic resin, so that the bond between the above described coating and the above described thermoplastic resin can further be enhanced.

In particular, when the roughness is in the above described range, a better bond having an anchor structure can be provided, so that firmer sealing performance can be gained without causing the coating to crack.

Next, the best modes of the method for producing the resin-metal bonded body according to the present invention are described.

The method for producing the above described resin-metal bonded body according to the present invention is provided with the anodic oxidation step, through which an aluminum metal member is used as an anode and electrolyzed with a current density of 0.02 A/dm$^2$ or higher and less than 2.5 A/dm$^2$, preferably 0.05 A/dm$^2$ to 1.0 A/dm$^2$, in an acid solution at 35-90° C., preferably at 50-90° C., so that an anodic oxide coating having a film thickness of 70-1500 nm, preferably 100-1000 nm, can be formed on the aluminum metal member, the water washing step, through which the aluminum metal member on which the anodic oxide coating is formed is washed with water at a temperature of 5° C. or more and less than 60° C., and the step of insert molding a thermoplastic resin on the aluminum metal member on which an anodic oxide coating is formed, and thus a bonded body of the above described aluminum member and thermoplastic resin is produced.

That is to say, the method for producing the above described first resin-metal bonded body according to the present invention is a method for producing a resin-metal bonded body by forming an anodic oxide coating that forms a chemical bond and an anchor bond with a thermoplastic resin on an aluminum metal member, generating an acid-base bond between the aluminum oxide in the anodic oxide coating and the main skeleton of the thermoplastic resin under high pressure at a high temperature when a molten thermoplastic resin is insert molded on the aluminum metal member on which the coating is formed and which is used as an insert member, and at the same time bonding the aluminum metal member and the thermoplastic resin through insert molding.

A preferable example is described below.

First, a preprocess is carried out on the aluminum metal member if necessary. Concretely, in the case where a foreign substance, such as an organic material, is attached, it is removed, and a step of washing the surface of the aluminum metal member by removing grease, activating the surface and washing with water may be provided if necessary.

As concerns the removal of grease, methods for immersing the aluminum metal member in an organic solvent and a method for immersing it in an alkali solution, such as of sodium hydroxide, can be cited as examples, and desmut activation can be carried out in accordance with a method for immersing the aluminum metal member in an acid solution, such as of sulfuric acid, nitric acid or a mixed solution of sulfuric acid and hydrogen peroxide.

In the above described anodic oxidation step, a well-known anodic oxidation method for electrolysis in an acid solution using the aluminum metal member as an anode and the insoluble electrode as a cathode can be used.

Examples include methods for forming an anodic oxide coating of aluminum oxide by anodic oxidizing the surface of the aluminum metal member in accordance with a cyclic method, constant current methods, current potential methods, pulse constant potential methods and pulse constant current methods.

Any cathode can be used as the cathode, as long as it does not react with the acid solution or have too low a conductivity, and usually an insoluble conductor plate, such as of platinum, stainless steel or carbon, is used.

In addition, the acid solution is not particularly limited, and examples are phosphoric acid, chromic acid, oxalic acid and sulfuric acid solutions, and these can be used alone, or two or more may be mixed. From among these acid solutions, sulfuric acid and oxalic acid are preferable, from the point of view of safety.

Furthermore, the temperature of the acid solution is 35-90° C., preferably 50-90° C. When the anodic oxidation step is carried out at such a temperature, a dense anodic oxide coating having microscopic pores can be formed. Accordingly, the thermoplastic resin can enter through the microscopic pores, making it possible to improve the adhesion, due to anchor effects.

This is because in the case where the temperature is lower than 35° C., an alumite layer where the diameter of pores in the formed anodic oxide coating is 100 nm or more is formed, and therefore, the adhesion with the thermoplastic resin resulting from the anchor effects lowers, while in the case where the temperature exceeds 90° C., the anodic oxide coating that becomes an adhesive layer dissolves, and thus, a constant thickness cannot be secured for the anodic oxide coating that is to become an adhesive layer, and thus the adhesiveness lowers.

In addition, the current density for electrolysis during the anodic oxidation step is 0.02 A/dm$^2$ or higher and less than 2.5 A/dm$^2$, preferably 0.05 A/dm$^2$ to 1.0 A/dm$^2$, and an anodic oxide coating having a film thickness of 70-1500 nm is formed by setting an appropriate time.

When the current density is 0.02 A/dm$^2$ or higher and less than 2.5 A/dm$^2$, a dense coating having a film thickness of 70-1500 nm with microscopic pores can be easily formed.

Meanwhile, in the case where the current density is less than 0.02 A/dm$^2$, the rate of formation of the film is very low, and dense microscopic pores fail to be created, and thus the adhesion lowers, while in the case where the current density is 2.5 A/dm$^2$ or higher, the diameter of the pores is too large, and the adhesion lowers.

Here, in the present invention, the current density is shown as values gained by dividing the current value set in the power supply (product number HKD-8200F, made by Sansha Electric Manufacturing Co., Ltd.) by the surface area of the aluminum metal member.

In the case where a sulfuric acid solution is used, for example, the concentration of the solution is 0.1-10 mol/L, the current density is 0.05 A/dm$^2$ or higher and less than 2.5 A/dm$^2$, and the temperature is 35-90° C., when anodic electrolysis is carried out for 30 seconds to 100 minutes, so that an anodic oxide coating is formed.

The thus formed anodic oxide coating has a rough surface with the above described microscopic pores.

The ratio of the black area on the anodic oxide coating in scanning electron microscope (SEM) photographs is 50-70%, preferably 50-60%.

The black portions can be considered to correspond to the roughness on the surface of the coating.

It is assumed that the thermoplastic resin member provides an anchor bond with the roughness on the surface of the anodic oxide coating in the aluminum metal member so as to enhance the strength of adhesion when the ratio of black portions (possibly recess portions) is within this range.

Next, the aluminum metal member on which the anodic oxide coating is formed is washed with water at a temperature of 5-60° C., preferably 10-50° C.

During the water washing step, the acid solution sticking to the anodic oxide coating is removed, and the thus gained anodic oxide coating has an infrared absorption spectrum peak intensity ascribed to the OH group of 0.0001-0.16, preferably 0.005-0.07.

The aluminum metal member is washed with faucet water at normal temperature a number of times, for example, and after that washed with water at 50° C. for 30 seconds.

In the case where the temperature is less than 5° C., the acid solution sticking to the anodic oxide coating cannot be sufficiently removed, while in the case where the temperature exceeds 60° C., the level of the OH group in the anodic oxide coating becomes too high, and the infrared absorption spectrum peak intensity ascribed to the OH group has a value exceeding 0.16, and thus, the bonding strength lowers.

Next, the aluminum metal member is dried after being washed with water, and after that the thermoplastic resin is bonded to the aluminum metal member in the step of insert molding the thermoplastic resin that is melted at a high temperature under high pressure on the aluminum metal member on which the coating is formed, which is used as an insert part, and thus, a resin-metal bonded body is produced.

During insert molding, the aluminum metal member is also exposed to high temperatures, and therefore, a weak acid-base bond is created between the aluminum metal member and the main skeleton of the thermoplastic resin, and a bond having an anchor structure between the aluminum metal member and the thermoplastic resin as a result of the roughness of the anodic oxide coating is created, as described above, and thus, the bond between the above described coating and the thermoplastic resin can be enhanced.

In addition, appropriate conditions can be set for the molding pressure and the rate of injection, depending on the used molding machine, the type of mold resin and the shape of the mold.

An example of the method for producing the above described second resin-metal bonded body according to the present invention is provided with the anode oxidation step of forming an anodic oxide coating having a film thickness of 70-1500 nm on an aluminum metal member through electrolysis with a current density of 0.02 A/dm$^2$ or higher and less than 2.5 A/dm$^2$, preferably 0.05 A/dm$^2$ to 1.0 A/dm$^2$, in an acid solution at 35-90° C., preferably at 50-90° C., using the aluminum metal member as an anode, the electrolytic polymerization step of electrolyzing the aluminum metal member on which the anodic oxide coating is formed in a solution containing a triazine thiol derivative using the aluminum metal member as an anode, so that a triazine thiol derivative is provided in the inner and upper portions of the anodic oxide coating, the water washing step of washing the aluminum metal member on which an anodic oxide coating having triazine thiol in it is formed with water at a temperature of 5° C. or higher and less than 60° C., and the step of insert molding the thermoplastic resin on the aluminum metal member on which an anodic oxide coating having triazine thiol in it is formed, and thus, the method allows the above described aluminum metal member and the thermoplastic resin to be bonded together.

The above described method is provided with an electrolytic polymerization step of providing a triazine thiol derivative in the inner and upper portions of the aluminum metal member on which the anodic oxide coating is formed through electrolysis in a solution containing a triazine thiol derivative using the aluminum metal member on which the anodic oxide coating is formed as an anode between the anode oxidation step and the water washing step in the method for producing the above descried first resin-metal bonded body.

Here, the anode oxidation step, the water washing step and the insert molding step on the thermoplastic resin are the same as in the method for producing the above described first resin-metal bonded body.

It is desirable for the aluminum oxide content in the anode oxide coating provided with triazine thiol in the upper and inner portions to be 98-99.5 mass %.

A content is in this range allows for a sufficiently strong anchor bond between the anode oxide coating and the thermoplastic resin, as well as a sufficiently strong bond between the triazine thiol derivative in the anode oxide coating and the thermoplastic resin, and thus, the bonding strength between the aluminum metal member and the thermoplastic resin member can further be enhanced.

During the electrolytic polymerization step, a voltage is applied for electrolytic polymerization between the anode, which is the aluminum metal member to be treated, and the cathode, which is the above described insoluble conductor, in a solution containing a triazine thiol derivative, an organic solution, or a mixed liquid of these.

As for the method for electrolytic polymerization, a cyclic method, a constant current method, a constant potential method, a pulse constant potential method or a pulse constant current method can be used, for example.

The concentration of the triazine thiol derivative in the above described electrolyte containing triazine thiol is not particularly limited, but preferably 0.001-0.5 mass %, more preferably 0.001-0.01 mass %.

A concentration in this range allows sufficient triazine thiol to be provided in the upper and inner portions of the above described anodic oxide coating while at the same time preventing a large amount of triazine thiol derivative from remaining unreacted.

It is not desirable for a large amount of triazine thiol derivative to remain unreacted, because it may in some cases prevent the bonding strength between the aluminum metal member and the thermoplastic resin member from increasing.

The above described solution containing a triazine thiol derivative or organic solution may contain an electrolyte if necessary, and there is no particular limitation to the electrolyte salt, as long as it dissolves in a solvent, provides conductivity, and is stable, and generally, NaOH, $Na_2CO_3$, $Na_2SO_4$, $K_2SO_4$, $Na_2SO_3$, $K_2SO_3$, $NaNO_2$, $KNO_2$, $NaNO_3$, $NaClO_4$, $CH_3COONa$, $Na_2B_2O_7$, $NaH_2PO_2$, $(NaPO_3)_6$, $Na_2MoO_4$, $Na_3SiO_3$ and $Na_2HPO_3$ are appropriate for use.

The concentration is not particularly limited, but in general a range of 0.001-10 mol/L is preferable, from the point of view of effectiveness of the triazine thiol, and a range of 0.01-5 mol/L is desirable.

It is desirable for the above described solvent to dissolve the electrolyte and the triazine thiol derivative at the same time, and there are no particular limitations in terms of the combination used, and water, methanol, ethanol, diethylene glycol monobutyl ether, ethylene glycol monoethyl ether, dimethyl formamide, methyl pyrolidone, acrylonitrile, ethylene carbonite, isopropyl alcohol, acetone, toluene, ethyl cellusolve, dimethyl formaldehyde, tetrahydrofuran, methyl ethyl ketone, benzene and ethyl acetate can be used as the solvent, for example.

The temperature of the above described electrolyte depends on the freezing point and boiling point of the solvent, and therefore cannot be specified uniquely, but in the case of a solution, for example, it may be 10-90° C., preferably 20-60° C.

In accordance with constant potential methods, for example, the potential is in such a range that the water or solvent does not decompose, and the range depends on the type of solvent and electrode, and therefore cannot be limited uniquely, but it may be −0.5-2 VvsSCE, preferably within a range of the natural potential to the oxidation potential. In the case where the potential is lower than the natural potential, polymerization does not occur, while in the case where the potential exceeds the oxidation potential, there is a risk that the water or solvent may decompose.

In addition, in constant current methods, the current density is preferably 0.005-50 mA/cm$^2$, more preferably 0.05-5 mA/cm$^2$. In the case where it is lower than 0.005 mA/cm$^2$, it takes too much time for the coating to grow. Meanwhile, in the case where it is greater than 50 mA/cm$^2$, the coating may crack and the Al metal elute, which is not preferable. The potential and current density for electrolysis in the pulse method are as described above, and the time interval is 0.01-10 minutes, preferably 0.1-2 minutes, and can be determined as appropriate within this range.

It should be noted that the effects of the pulse method may not be sufficient when the time interval is shorter than 0.1 minute or longer than 10 minutes.

The thus formed anodic oxide coating provided with triazine thiol in the upper and inner portions has a chemical bond between the triazine thiol derivative and the aluminum metal member, and a covalent bond and an acid-base bond between the triazine thiol derivative and the terminal functional group of the thermoplastic resin, in addition to the above described bond resulting from the $Al_2O_3$ in the anodic oxide coating, and therefore, a stronger bonding strength and durability can be gained.

That is to say, a coating having excellent adhesion to Al can be formed between the triazine thiol derivative and the aluminum metal member, due to the properties of the —SH in the triazine thiol derivative, and at the same time, the triazine thiol in the coating is polymerized during insert molding under high pressure at high temperature, so that a covalent bond and an acid-base bond are formed as described above.

Another example of the method for producing the above described second resin-metal bonded body according to the present invention is provided with the step of forming an anode oxide coating having a triazine thiol derivative in the inner and upper portions with a film thickness of 70-1500 nm on an aluminum metal member through electrolysis with a current density of 0.02 A/dm$^2$ or higher and less than 2.5 A/dm$^2$, preferably 0.05 A/dm$^2$ to 1.0 A/dm$^2$, in an acid solution containing a triazine thiol derivative at 35-90° C., preferably 50-90° C., using the aluminum metal member as an anode, the water washing step of washing the aluminum metal member on which the anodic oxide coating having triazine thiol is formed with water at a temperature of 5° C. or higher and less than 60° C., and the step of insert molding a thermoplastic resin on the aluminum metal member on which the anodic oxide coating having triazine thiol is formed after washing with water, and thus, the method allows the above described aluminum metal member and the thermoplastic resin to be bonded together.

In accordance with this method, the above described anodic oxidation step and the electrodeposition step are carried out simultaneously, and concretely, the above described acid solution used in the anodic oxidation step contains a triazine thiol derivative, as in the above described electrodeposition step, and thus, the aluminum metal member is used as an anode for anodic electrolysis.

The used solution, electrolyte, concentration and temperature of the solution are the same as in the above described anodic oxidation step and electrodeposition step, and in the same range.

The anodic oxide coating gained in accordance with this method includes triazine thiol in the inner and upper portions.

Still another example of the method for producing the above described second resin-metal bonded body according to the present invention is provide with an anodic oxidation step of forming an anodic oxidation coating having a film thickness of 70-1500 nm on an aluminum metal member through electrolysis with a current density of 0.02 A/dm$^2$ or higher and less than 2.5 A/dm$^2$, preferably 0.05 A/dm$^2$ to 1.0 A/dm$^2$, in an acid solution at 35-90° C., preferably at 50-90° C., using the aluminum metal member as an anode, an immersion step of immersing the aluminum metal member on which the anodic oxide coating is formed in a solution containing a triazine thiol derivative so that a triazine thiol derivative is provided in the inner and upper portions of the anodic oxide coating, a water washing step of washing the aluminum metal member on which the anodic oxide coating having triazine thiol in it is formed with water at a temperature of 5° C. or higher and less than 60° C., and a step of insert molding a thermoplastic resin on the aluminum metal member on which the anodic oxide coating having triazine thiol in it is formed after washing with water, and thus, the method allows the described aluminum metal member and the thermoplastic resin to be bonded together.

In accordance with this method, the above described electrodeposition step is an immersion step, through which a triazine thiol derivative is provided with an anodic oxide coating.

Concretely, during the immersion step, the aluminum metal member on which the above described anodic oxide coating is formed is immersed in a solution containing triazine thiol, an organic solution or a mixed liquid of these for 1-60 minutes, preferably for 5-30 minutes, so that triazine thiol is provided in the inner and upper portions of the anodic oxide coating.

The concentration of the solution of the triazine thiol derivative, the electrolyte and the temperature of the solution in this case are the same as in the above described electrodeposition step, and in the same range.

Methyl alcohol, ethyl alcohol, isopropyl alcohol, acetone, toluene, ethylene glycol monoethyl ether, dimethyl formaldehyde, tetrahydrofuran, methyl ethyl ketone, benzene and ethyl acetate are available as organic solvents.

In addition, the temperature for immersion differs depending on the concentration of the solution, the type of metal, and particularly the solvent used, and therefore cannot be specified, but generally 1-99° C. is possible for water, and a desirable range is 40-80° C.

Though in accordance with immersion treatment methods, a uniform coating can be generated on metal products having a complex shape, the coating has a low level of polymerization and is weak, and therefore, it is possible to convert the coating to a polymer coating having a high degree of polymerization as it is by applying heat of 100° C. or higher during insert molding after immersion, for example.

The thus gained resin-metal bonded body according to the present invention has a bonding strength of 40 MPa or higher when measured using a precision load measuring device (product number MODEL-1840N, made by Aikoh Engineering Co., Ltd.).

In addition, when the gained resin-metal bonded body is set in a high temperature, high humidity device (product number IG47M, made by Yamato Scientific Co., Ltd.) (80° C., 95% RH), and left for 200 hours (high temperature, high humidity test), it will be found that the bonding strength is 30 MPa or higher and no break or peeling can be observed on the bonding surface in the above described test.

Accordingly, the resin-metal bonded body according to the present invention has excellent durability, so that excellent strength can be maintained over a long period of time even when it is used in rough environments.

EXAMPLES

The present invention is described using the following examples, comparative examples and test examples.

Here, the examples and comparative examples can be implemented using the following metal test plates, chemicals and resins.
(Aluminum Plate)
Aluminum plate: A1050 (JIS standard), 12 mm×40 mm×3 mm (thickness)

(Resin)

The used thermoplastic resins were as follows.

PPS (polyphenylene sulfide), trade name: Susteel BGX-130, made by Tosoh Corporation PBT (polybutylene terephthalate), trade name: Duranex 7407, made by Polyplastics Co., Ltd.

Here, in the examples and comparative examples, the value for the strength of initial adhesion, the strength against high temperature and high humidity, the thickness of the anodic oxide coating, the peak intensity and the ratio of the black area were measured as follows.

(Strength of Initial Adhesion)

The strength of initial adhesion can be represented by a value gained by measuring the strength of adhesion of the gained resin-metal bonded body using a high-precision load measuring device (product number MODEL-1840N, made by Aikoh Engineering Co., Ltd.).

(Strength Against High Temperature and High Humidity)

The strength against high temperature and high humidity can be represented by a value gained by measuring the strength of adhesion of the gained resin-metal bonded body using a high-precision load measuring device (product number MODEL-1840N, made by Aikoh Engineering Co., Ltd.) after installing the resin-metal bonded body in a high-temperature high-humidity container (product number IG47M, made by Yamato Scientific Co., Ltd.) (80° C., 95% RH) and leaving it for 200 hours.

(Peak Intensity)

The infrared absorption spectrum peak intensity can be represented by a value of 4000 cm$^{-1}$ to 3000 cm$^{-1}$ measured using a Fourier transform infrared spectrometer (product number JIR-WINSPEC100, made by JEOL Ltd.) under such conditions that the mode for measurement is a highly sensitive reflection method, the detector is MCT, the resolution is 4 cm$^{-1}$, the number of additions is 100 times, and the range of measurement is 4000 cm$^{-1}$ to 400 cm$^{-1}$.

(Thickness of Anodic Oxide Coating)

The gained resin-metal bonded body was cut to a thickness of approximately 100 nm, and thus samples for measurement were fabricated, so that the film thickness of the coating on the surface where the aluminum metal member is bonded with the thermoplastic resin using a microtome (product number Ultracut S, made by LEICA aktiengesellschaft).

Next, the cross section in the interface where the aluminum metal member and the thermoplastic resin are bonded together in the sample for measurement was observed through a TEM (transmission electron microscope, product number H-800 Electron Microscope, made by JEOL Ltd.) in order to measure the distance between the upper end of the anodic oxide coating and the aluminum metal member across the border from photographs with a magnification of 20,000 times, and the average value was gained.

(Ratio of Black Area)

The surface of the anodic oxide coating formed on the surface of the aluminum metal member was observed through an SEM (scanning electron microscope, product number JSM-6701F, made by JEOL Ltd.) with a magnification of 200,000 times, and the brightness of the gained image was adjusted using Photoshop (made by Adobe Systems Incorporated) so that the threshold became 140 in analySIS FIVE (made by Olympus Corporation), and after that, portions with a brightness below the threshold value were converted to black and portions with a brightness of the threshold value or higher converted to white, so that the image became black and white, using the above described analySIS FIVE, and thus, the value of the ratio of the black portions to the total area could be calculated.

Example 1

Figure 3:
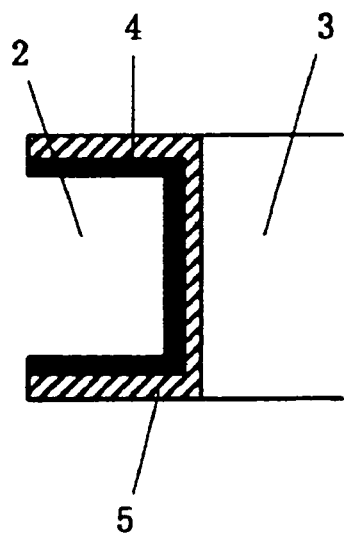
FIG. 3 is a schematic diagram showing another example of the bonded portion of a resin-metal bonded body.

An example is described in FIGS. 1 and 3 below. Here, FIG. 3 is a schematic diagram showing a resin-metal bonded body.

The surface of an aluminum plate 2 underwent the following preprocess.

Concretely, the aluminum plate 2 was immersed in a sodium hydroxide solution (industrial chemical made by Tosoh Corporation, concentration: 50 g/L) heated to 40° C. for one minute, and after that sufficiently washed with water and immersed in a refined sulfuric acid solution (made by The North Japan Industry Co., Ltd., purity: 98%, concentration: 0.2 mol/L) at 30° C. for two minutes, followed by washing with water, and a degreasing process was carried out on the surface of the aluminum plate.

After the above described preprocess, the acid solution of the above described refined sulfuric acid (concentration: 0.5 mol/L) was heated to 60° C., the aluminum plate was used as an anode, and a titanium plate was used as an insoluble cathode, so that anodic electrolysis could be carried out with a current density of 0.3 A/dm$^2$ for 60 seconds, and an anodic oxide coating 4 was formed on the aluminum plate 2, which was then washed with water and dried.

The thickness of the gained anodic oxide coating 4 was 250 nm (anodic oxidation process).

Here, the current density in the present invention has a value gained by dividing the current value as set at the power supply (product number HKD-8200F, made by Sansha Electric Manufacturing Co., Ltd.) by the surface area of the aluminum metal member.

Next, anodic electrolysis was carried out on the aluminum plate on which the anodic oxide coating 4 was formed in an electrolyte (of 25° C.) having 0.0006 mol/L of 1,3,5-triazine-2,4-dithiol-6-sodium thiolate (hereinafter referred to as TTN) and 0.1 mol/L of sodium nitrite (first-class chemical made by Kanto Chemical Co., Inc.) at 8 V for ten minutes, so that the TTN5 is provided inside and on top of the above described anodic oxide coating (electrolytic polymerization process).

Here, the anodic electrolysis was carried out using the aluminum plate on which the anodic oxide coating 4 was formed as an anode, and an SUS 304 plate as an insoluble cathode.

The aluminum plate 2 on which an anodic oxide coating (4) having TTN (5) was formed was washed with water at 50° C. for one minute, and moisture was sufficiently removed using an air blower, followed by drying at 60° C. for 4 minutes using a dryer in which dry air circulated.

Figure 4:
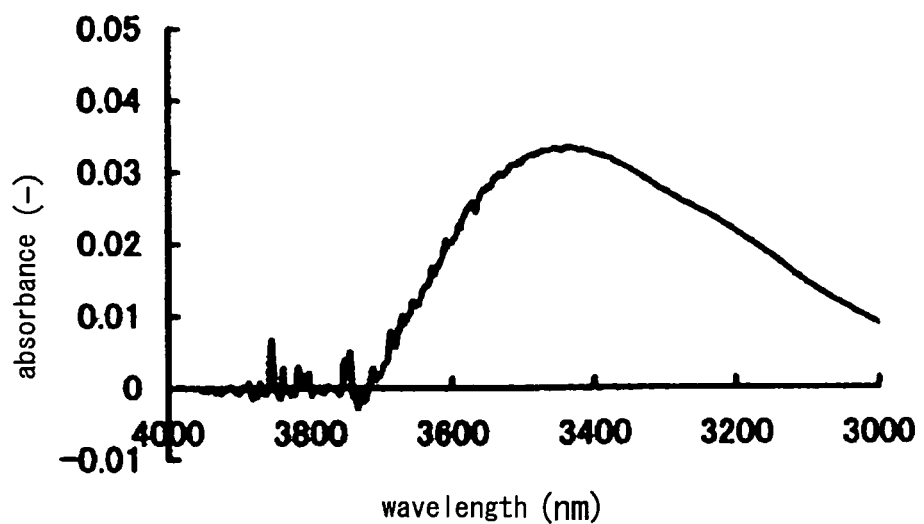
FIG. 4 is a graph showing the infrared absorption spectrum intensity ascribed to the OH group in the anodic oxide coating in an example of the resin-metal bonded body according to the present invention.

At this time, the infrared absorption spectrum peak intensity ascribed to the OH group in the anodic oxide coating 4 was 0.032 (FIG. 4).

Figure 9:
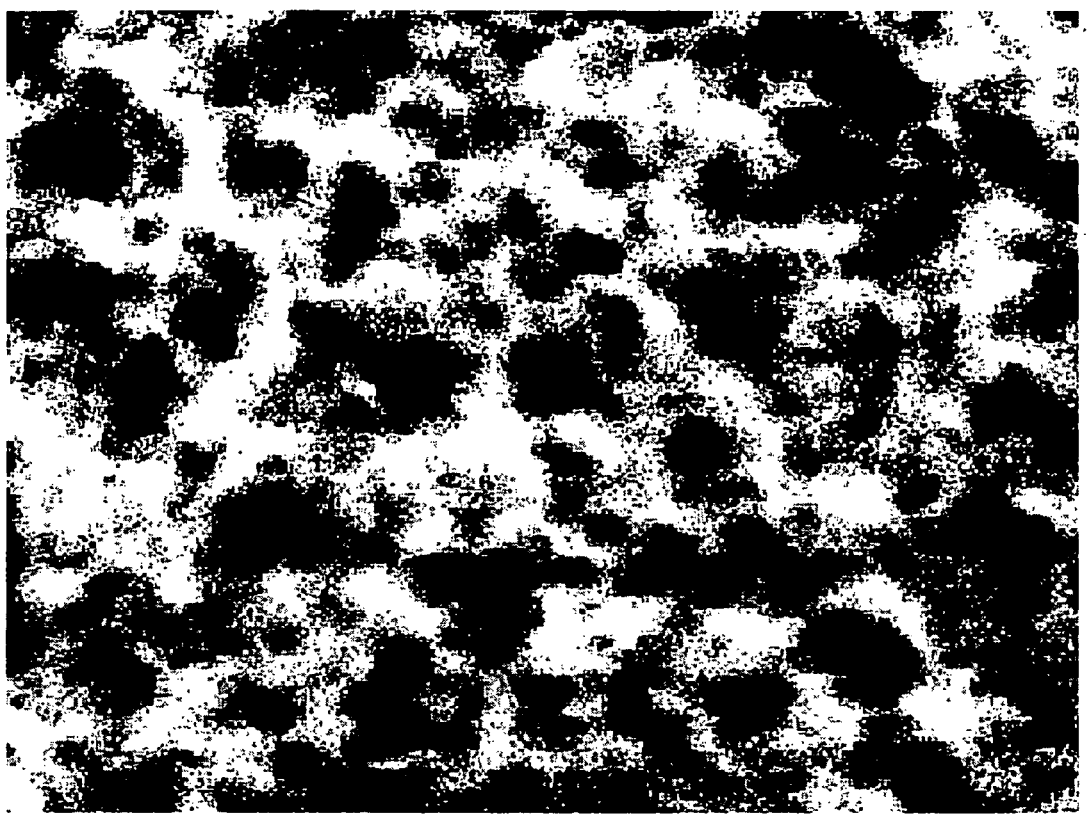
FIG. 9 is a black and white (ratio of black area) diagram showing an image gained by changing an SEM photograph of an anodic oxide coating in an example of the resin-metal bonded body according to the present invention.

In addition, the ratio of the black area was 53.1% (FIG. 9).

Next, injection molding of a PPS was carried out on the aluminum plate 2 on which an anodic oxide coating (4) having TTN (5) was formed using an injection molder (TH20E, made by Nissei Plastic Industrial Co., Ltd.) with a temperature for molding of 140° C. and a pressure for injection of 180 MPa (insert molding process), and thus, a resin-metal bonded body 1 where the aluminum plate and the PPS resin member were bonded together through the anodic oxide coating (4) having TTN (5) formed on the aluminum plate 2 (FIGS. 1 and 3).

Example 2

A resin-metal bonded body was manufactured in the same manner as in the above described Example 1, except that the temperature of the refined sulfuric acid solution during the above described anodic oxidation process was 50° C.

At this time, the thickness of the anodic oxide coating 4 was 650 nm and the infrared absorption spectrum peak intensity ascribed to the OH group in the anodic oxide coating 4 was 0.0636.

Example 3

A resin-metal bonded body was manufactured in the same manner as in the above described Example 1, except that the temperature of the refined sulfuric acid solution during the above described anodic oxidation process was 70° C.

At this time, the thickness of the anodic oxide coating 4 was 230 nm and the infrared absorption spectrum peak intensity ascribed to the OH group in the anodic oxide coating 4 was 0.031.

Example 4

A resin-metal bonded body was manufactured in the same manner as in the above described Example 1, except that the temperature of the refined sulfuric acid solution during the above described anodic oxidation process was 90° C.

Figure 10:
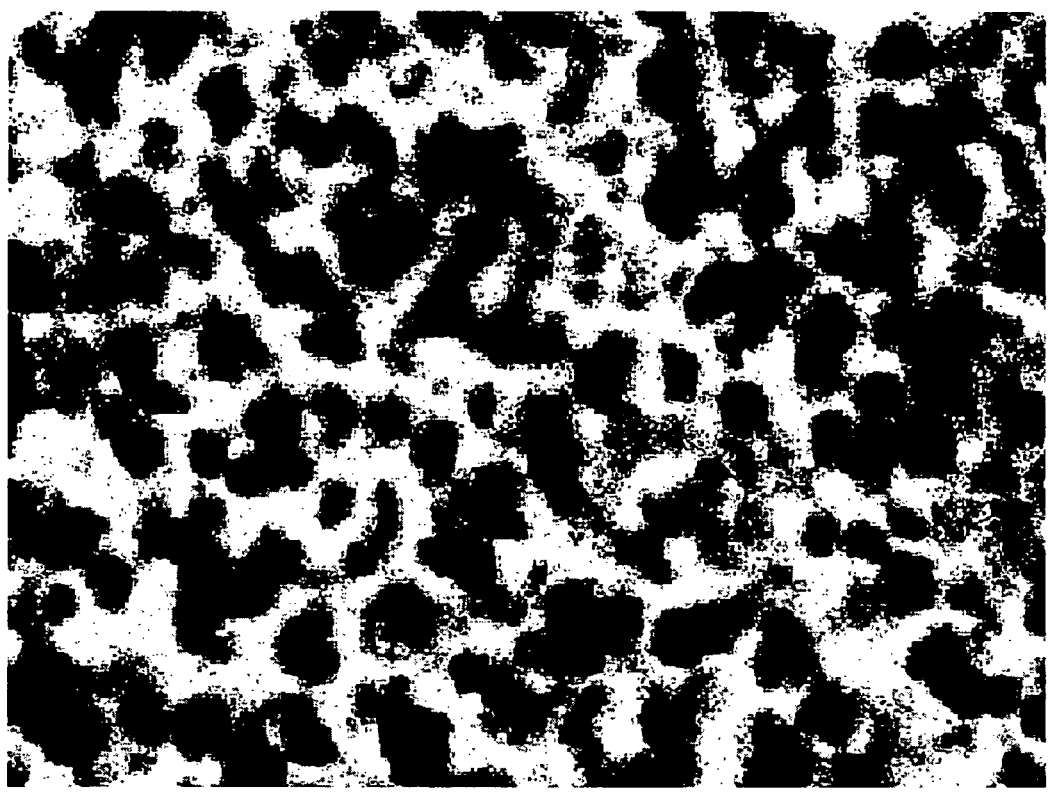
FIG. 10 is a black and white (ratio of black area) diagram showing an image gained by changing an SEM photograph of an anodic oxide coating in another example of the resin-metal bonded body according to the present invention.

At this time, the thickness of the anodic oxide coating 4 was 200 nm, the infrared absorption spectrum peak intensity ascribed to the OH group in the anodic oxide coating 4 was 0.034, and the ratio of the black area was 56.8% (FIG. 10).

Example 5

A resin-metal bonded body was manufactured in the same manner as in the above described Example 1, except that the current density during the above described anodic oxidation process was 0.05 A/dm$^2$.

At this time, the thickness of the anodic oxide coating 4 was 210 nm and the infrared absorption spectrum peak intensity ascribed to the OH group in the anodic oxide coating 4 was 0.032.

Example 6

A resin-metal bonded body was manufactured in the same manner as in the above described Example 1, except that the current density during the above described anodic oxidation process was 0.5 A/dm$^2$.

At this time, the thickness of the anodic oxide coating 4 was 270 nm and the infrared absorption spectrum peak intensity ascribed to the OH group in the anodic oxide coating 4 was 0.033.

Example 7

A resin-metal bonded body was manufactured in the same manner as in the above described Example 1, except that the current density during the above described anodic oxidation process was 2.4 A/dm$^2$.

Figure 11:
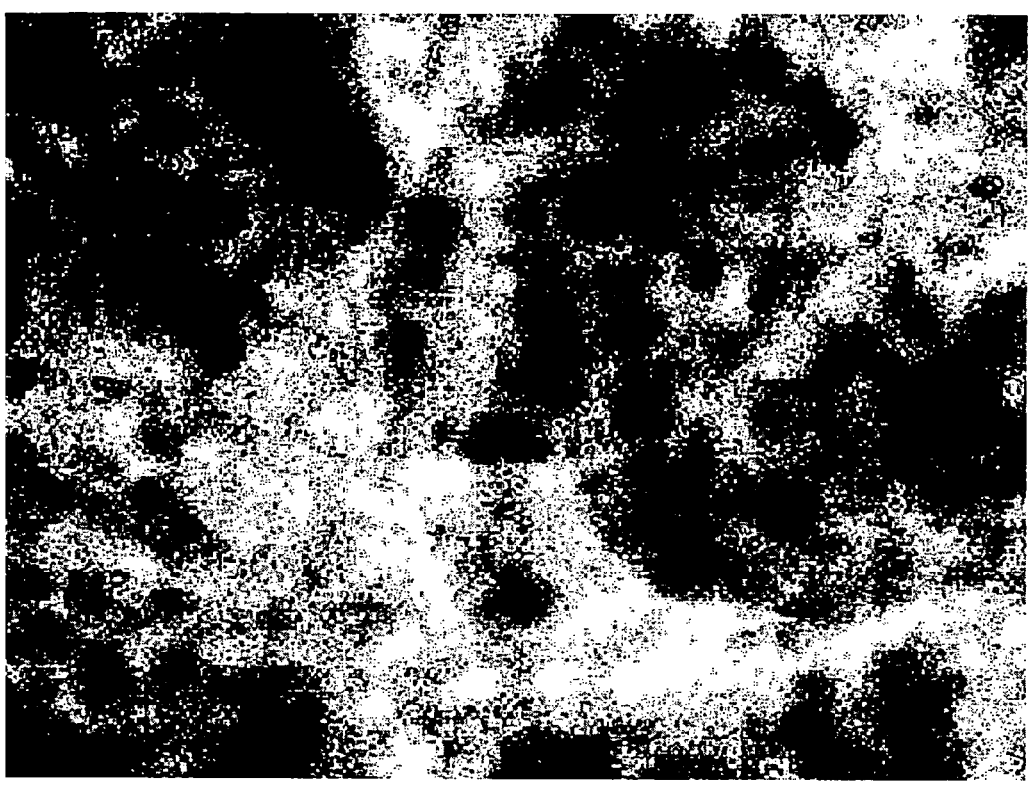
FIG. 11 is a black and white (ratio of black area) diagram showing an image gained by changing an SEM photograph of an anodic oxide coating in still another example of the resin-metal bonded body according to the present invention.

At this time, the thickness of the anodic oxide coating 4 was 250 nm, the infrared absorption spectrum peak intensity ascribed to the OH group in the anodic oxide coating 4 was 0.030, and the ratio of the black area was 54.1% (FIG. 11).

Example 8

A resin-metal bonded body was manufactured in the same manner as in the above described Example 1, except that The aluminum plate gained through the above described anodic oxidation process was immersed in a solution of 0.0006 mol/L of TTN at 25° C. (immersion process) instead of the above described electrolytic polymerization process.

Figure 12:
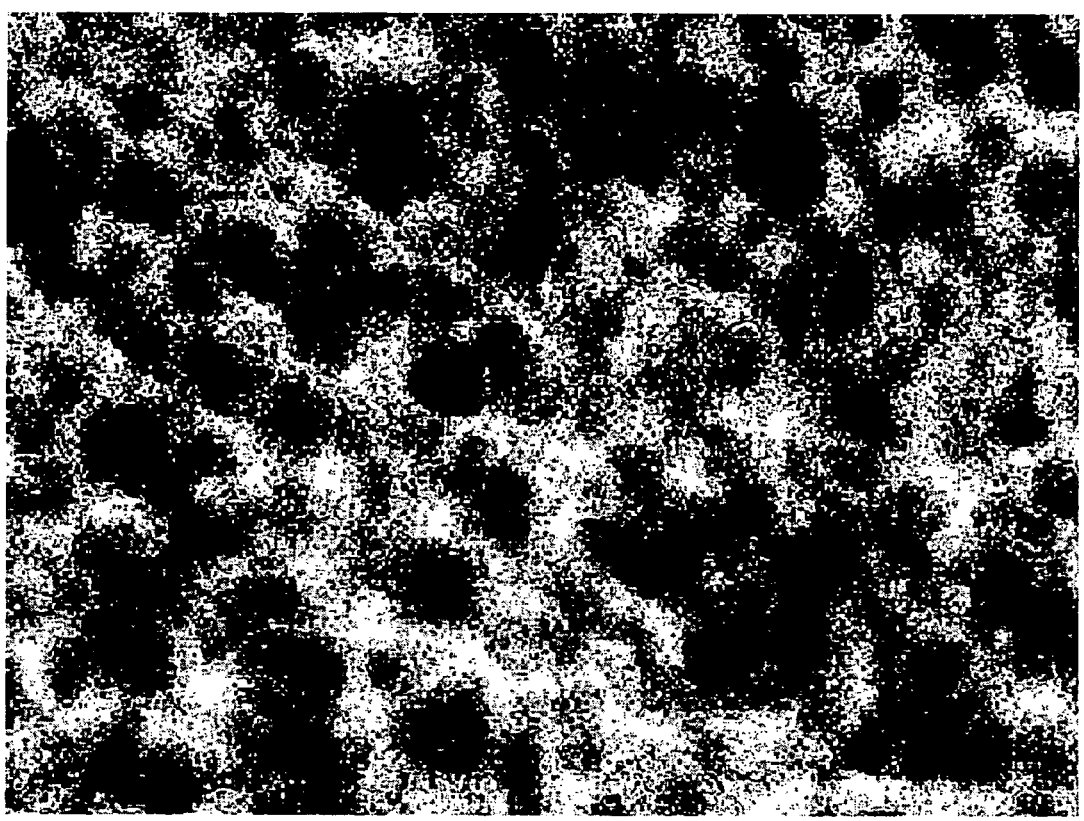
FIG. 12 is a black and white (ratio of black area) diagram showing an image gained by changing an SEM photograph of an anodic oxide coating in yet another example of the resin-metal bonded body according to the present invention.

At this time, the thickness of the anodic oxide coating 4 was 280 nm, the infrared absorption spectrum peak intensity ascribed to the OH group in the anodic oxide coating 4 was 0.030, and the ratio of the black area was 58.0% (FIG. 12).

Here, if the resin-metal bonded body is manufactured in the same manner as in the above described Examples 2 to 7 and the below described Examples 9 to 11, but with the aluminum plate gained through the anodic oxidation process immersed in a solution of 0.0006 mol/L of TTN at 25° C. instead of the electrolytic polymerization process, it can be confirmed that the thickness of the anodic oxide coating and the infrared absorption spectrum peak intensity ascribed to the OH group in the gained resin bonded body is within the range of the present invention in all cases.

Example 9

Figure 2:
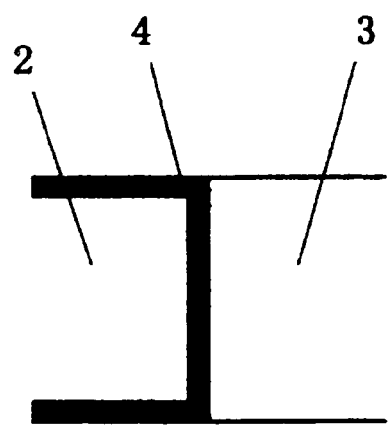
FIG. 2 is a schematic diagram showing an example of the bonded portion of a resin-metal bonded body.

A resin-metal bonded body was manufactured in the same manner as in Example 1, except that the refined sulfuric acid in the above described anodic oxidation process was substituted with oxalic acid (first class chemical made by Kanto Chemical Co., Inc.) (FIGS. 1 and 2).

Figure 5:
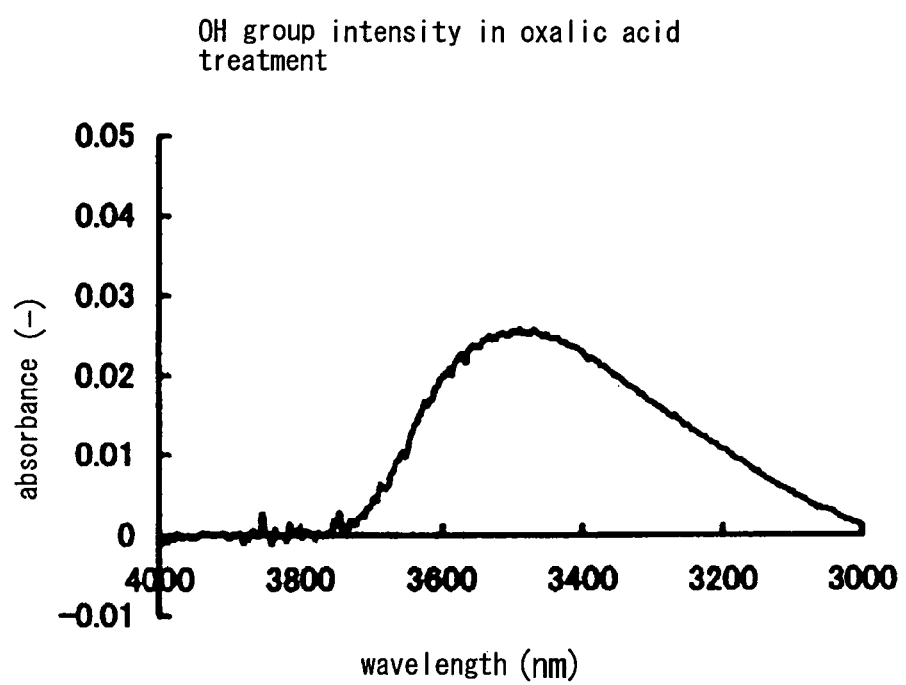
FIG. 5 is a graph showing the infrared absorption spectrum intensity ascribed to the OH group in the anodic oxide coating in another example of the resin-metal bonded body according to the present invention.
Figure 13:
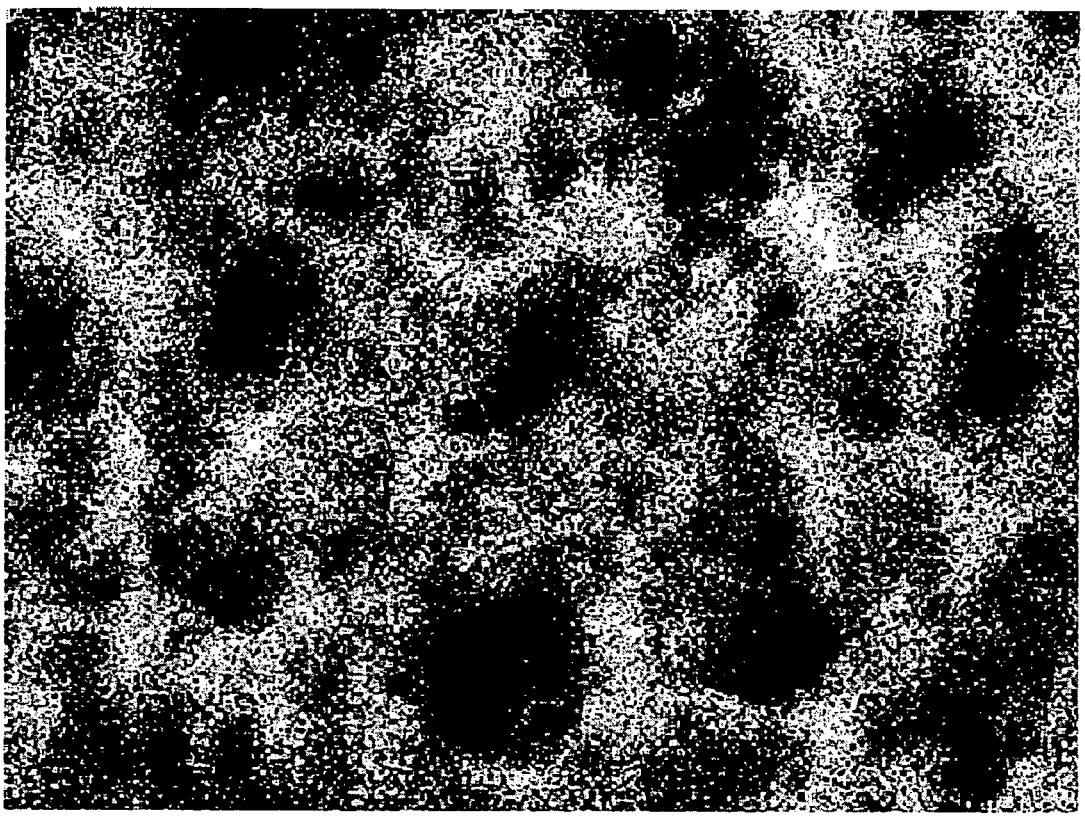
FIG. 13 is a black and white (ratio of black area) diagram showing an image gained by changing an SEM photograph of an anodic oxide coating in another example of the resin-metal bonded body according to the present invention.

At this time, the thickness of the anodic oxide coating 4 was 320 nm and the infrared absorption spectrum peak intensity ascribed to the OH group in the anodic oxide coating 4 was 0.026 (FIG. 5). In addition, the ratio of the black area was 54.4% (FIG. 13).

Example 10

A resin-metal bonded body was manufactured in the same manner as in Example 1, except that the temperature of the water for washing after the above described electrolytic polymerization process was 20° C. instead of 50° C. (FIGS. 1 and 2).

Figure 6:
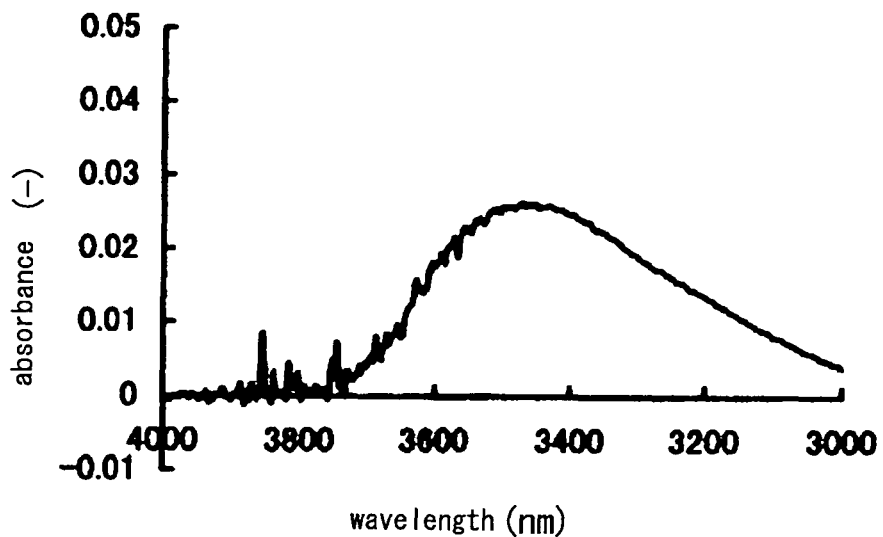
FIG. 6 is a graph showing the infrared absorption spectrum intensity ascribed to the OH group in the anodic oxide coating in still another example of the resin-metal bonded body according to the present invention.
Figure 14:
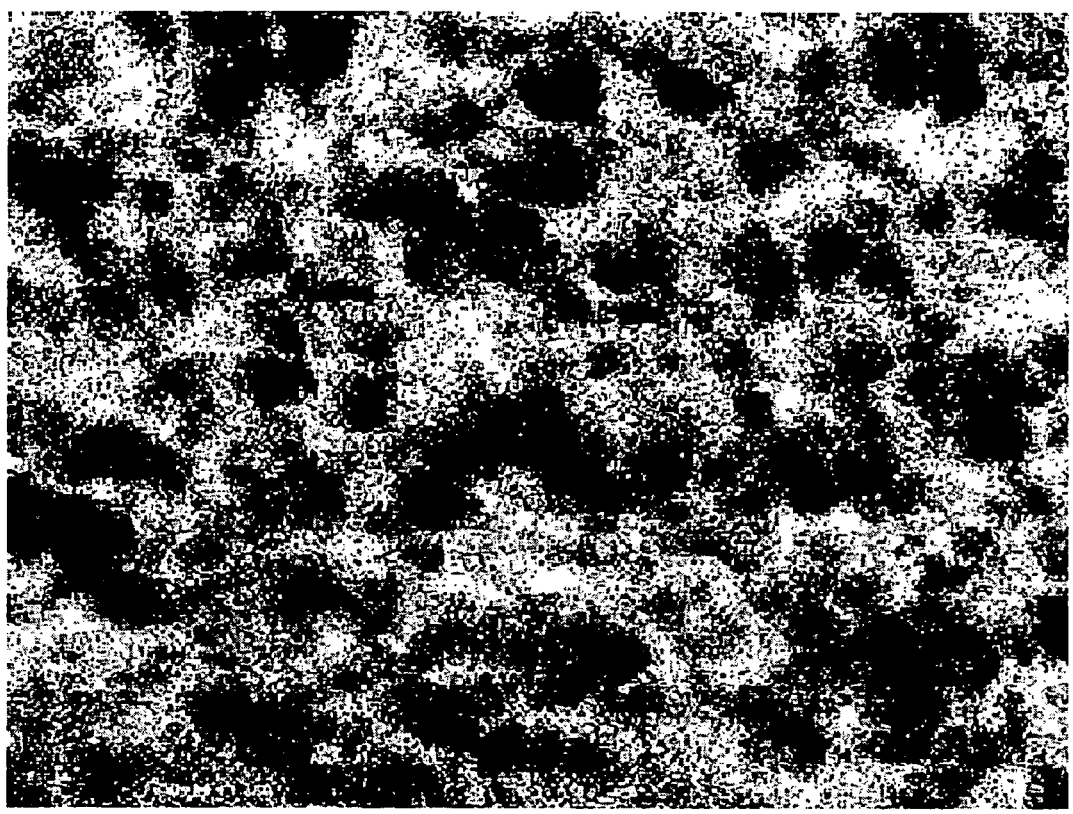
FIG. 14 is a black and white (ratio of black area) diagram showing an image gained by changing an SEM photograph of an anodic oxide coating in still another example of the resin-metal bonded body according to the present invention.

At this time, the thickness of the anodic oxide coating 4 was 240 nm and the infrared absorption spectrum peak intensity ascribed to the OH group in the anodic oxide coating 4 was 0.026 (FIG. 6). In addition, the ratio of the black area was 51.6% (FIG. 14).

Example 11

A resin-metal bonded body was manufactured in the same manner as in the above described Example 1, except that the anodic electrolysis in the anodic oxidation process was carried out for 10 minutes instead of 60 minutes.

Figure 15:
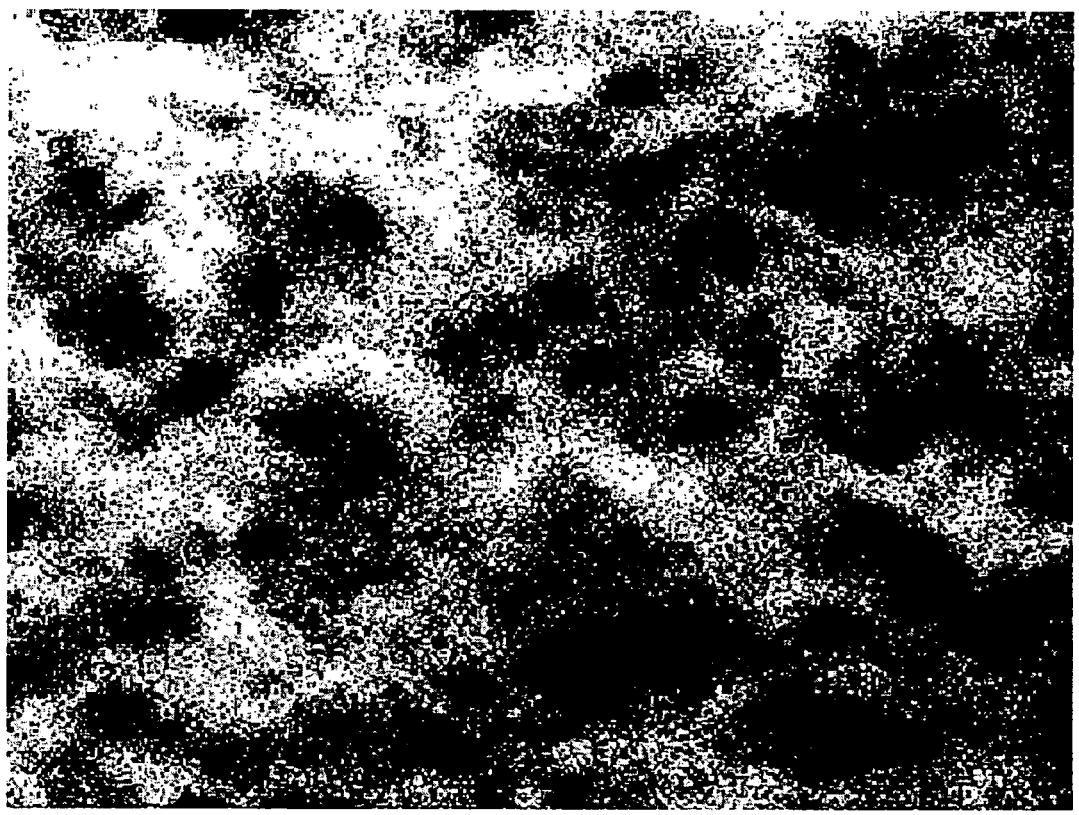
FIG. 15 is a black and white (ratio of black area) diagram showing an image gained by changing an SEM photograph of an anodic oxide coating in yet another example of the resin-metal bonded body according to the present invention.

At this time, the thickness of the anodic oxide coating 4 was 150 nm, the infrared absorption spectrum peak intensity ascribed to the OH group in the anodic oxide coating 4 was 0.030, and the ratio of the black area was 55.7% (FIG. 15).

Example 12

A resin-metal bonded body was manufactured in the same manner as in the above described Example 1, except that no electrolytic polymerization process was carried out (FIGS. 1 and 2).

Figure 7:
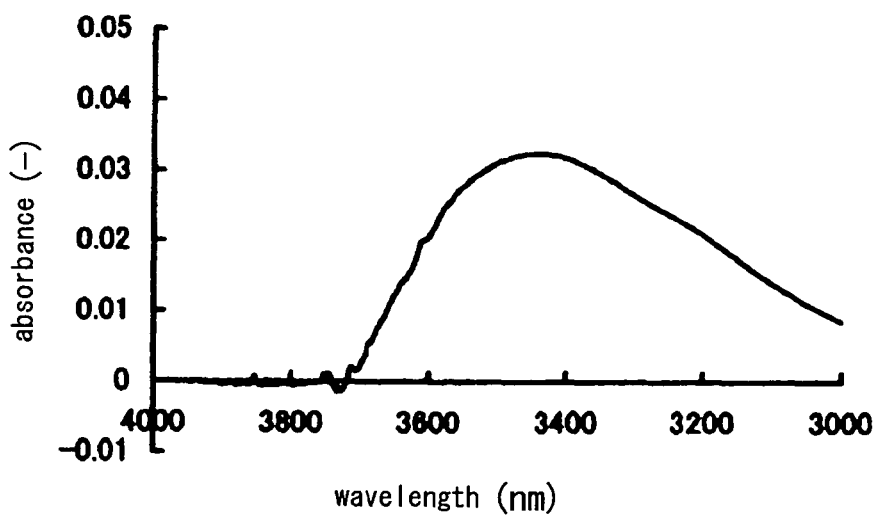
FIG. 7 is a graph showing the infrared absorption spectrum intensity ascribed to the OH group in the anodic oxide coating in an example of the resin-metal bonded body according to another invention.
Figure 16:
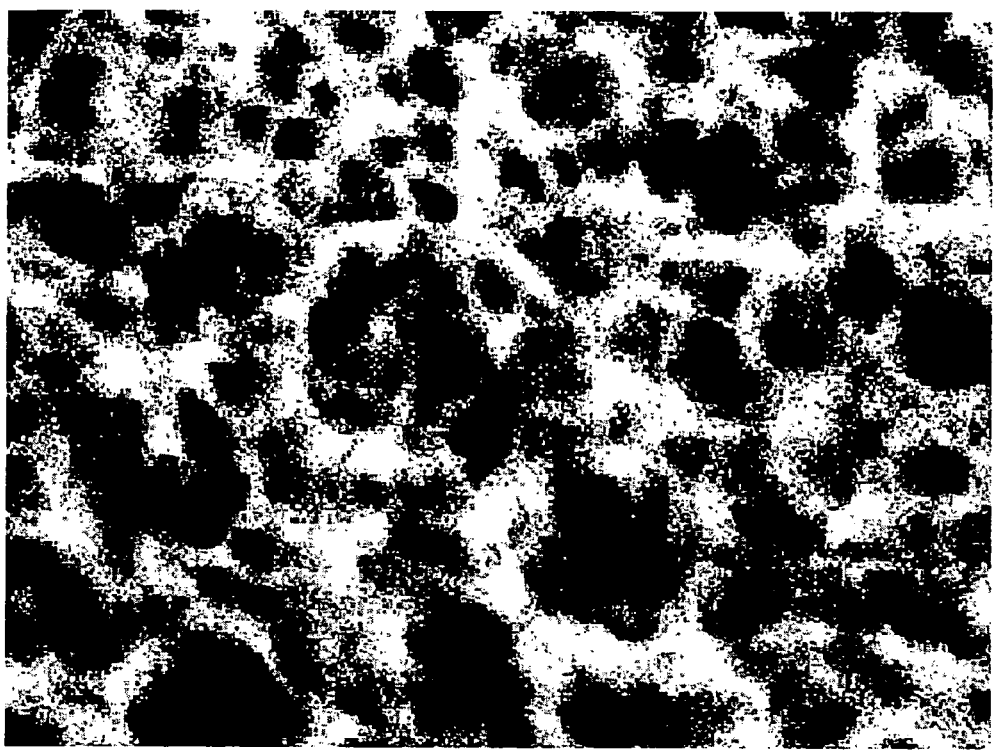
FIG. 16 is a black and white (ratio of black area) diagram showing an image gained by changing an SEM photograph of an anodic oxide coating in another example of the resin-metal bonded body according to the present invention.

At this time, the thickness of the anodic oxide coating 4 was 290 nm and the infrared absorption spectrum peak intensity ascribed to the OH group in the anodic oxide coating 4 was 0.032 (FIG. 7). In addition, the ratio of the black area was 54.9% (FIG. 16).

Here, if the resin-metal bonded body is manufactured in the same manner as in the above described Examples 2 to 7 and 9 to 11, but with the refined sulfuric acid during the anodic oxidation process including 0.0006 mol/L of 1,3,5-triazine-2,4-dithiol-6-sodium thiolate (hereinafter referred to as TTN) and an anodic oxide coating having triazine thiol inside and on top formed instead of the above described electrolytic polymerization process, it can be confirmed that the thickness of the anodic oxide film and the infrared absorption spectrum peak intensity ascribed to the OH group of the gained resin bonded body are in the range of the present invention in all cases.

Example 13

A resin-metal bonded body was manufactured in the same manner as in the above described Example 2, except that no electrolytic polymerization process was carried out (FIGS. 1 and 2).

At this time, the thickness of the anodic oxide coating 4 was 700 nm and the infrared absorption spectrum peak intensity ascribed to the OH group in the anodic oxide coating 4 was 0.070.

Example 14

A resin-metal bonded body was manufactured in the same manner as in the above described Example 3, except that no electrolytic polymerization process was carried out (FIGS. 1 and 2).

At this time, the thickness of the anodic oxide coating 4 was 250 nm and the infrared absorption spectrum peak intensity ascribed to the OH group in the anodic oxide coating 4 was 0.034.

Example 15

A resin-metal bonded body was manufactured in the same manner as in the above described Example 4, except that no electrolytic polymerization process was carried out (FIGS. 1 and 2).

Figure 17:
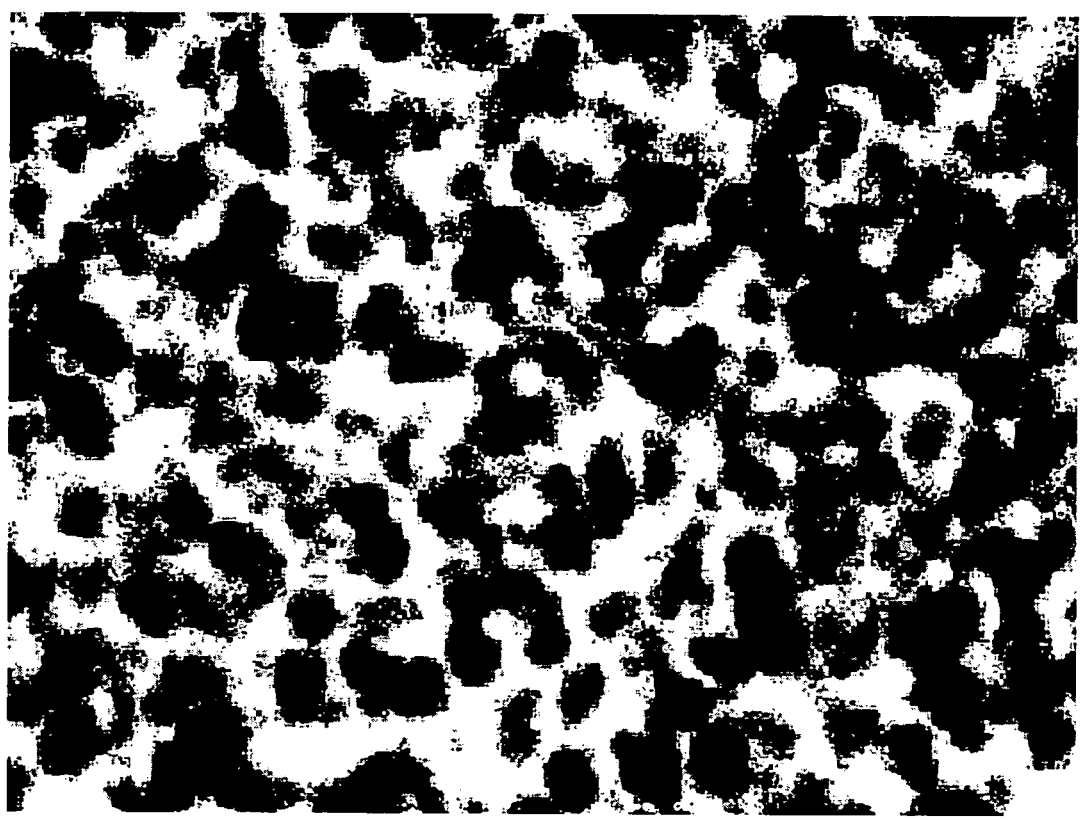
FIG. 17 is a black and white (ratio of black area) diagram showing an image gained by changing an SEM photograph of an anodic oxide coating in still another example of the resin-metal bonded body according to the present invention.

At this time, the thickness of the anodic oxide coating 4 was 220 nm, the infrared absorption spectrum peak intensity ascribed to the OH group in the anodic oxide coating 4 was 0.031, and the ratio of the black area was 55.5% (FIG. 17).

Example 16

A resin-metal bonded body was manufactured in the same manner as in the above described Example 5, except that no electrolytic polymerization process was carried out (FIGS. 1 and 2).

At this time, the thickness of the anodic oxide coating 4 was 300 nm and the infrared absorption spectrum peak intensity ascribed to the OH group in the anodic oxide coating 4 was 0.030.

Example 17

A resin-metal bonded body was manufactured in the same manner as in the above described Example 6, except that no electrolytic polymerization process was carried out (FIGS. 1 and 2).

Figure 18:
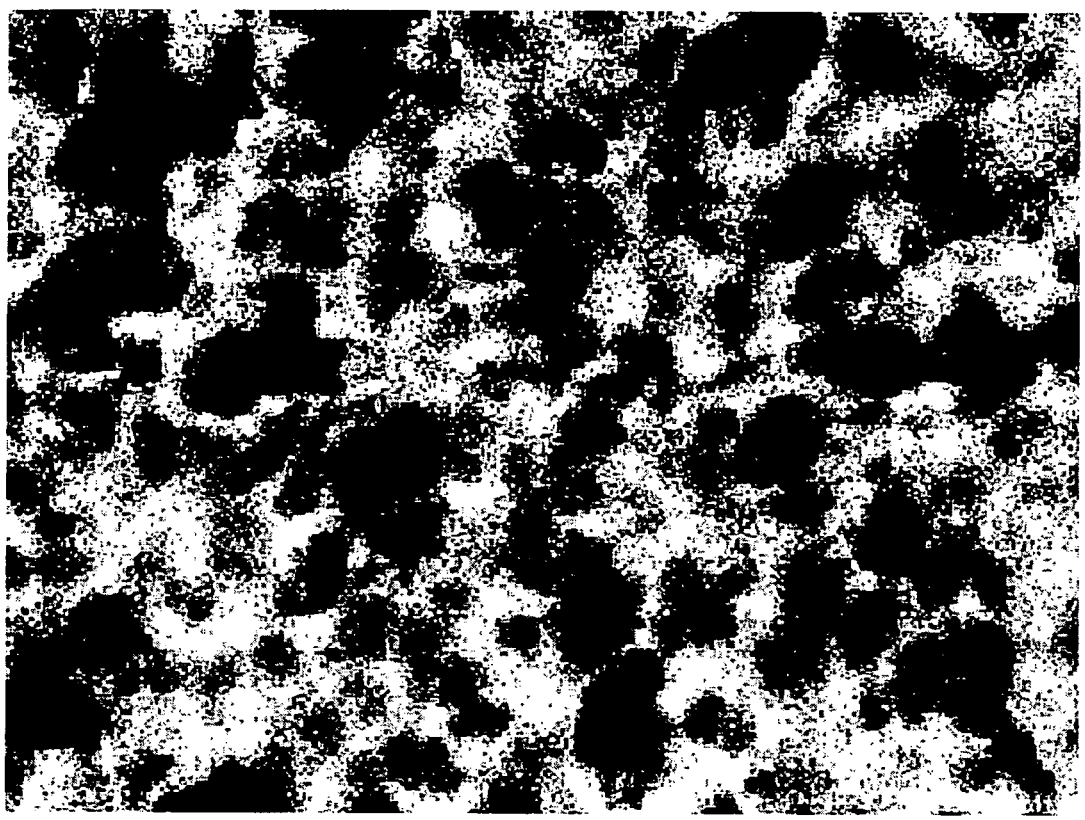
FIG. 18 is a black and white (ratio of black area) diagram showing an image gained by changing an SEM photograph of an anodic oxide coating in yet another example of the resin-metal bonded body according to the present invention.

At this time, the thickness of the anodic oxide coating 4 was 270 nm, the infrared absorption spectrum peak intensity ascribed to the OH group in the anodic oxide coating 4 was 0.033, and the ratio of the black area was 55.1% (FIG. 18).

Example 18

A resin-metal bonded body was manufactured in the same manner as in the above described Example 7, except that no electrolytic polymerization process was carried out (FIGS. 1 and 2).

Figure 19:
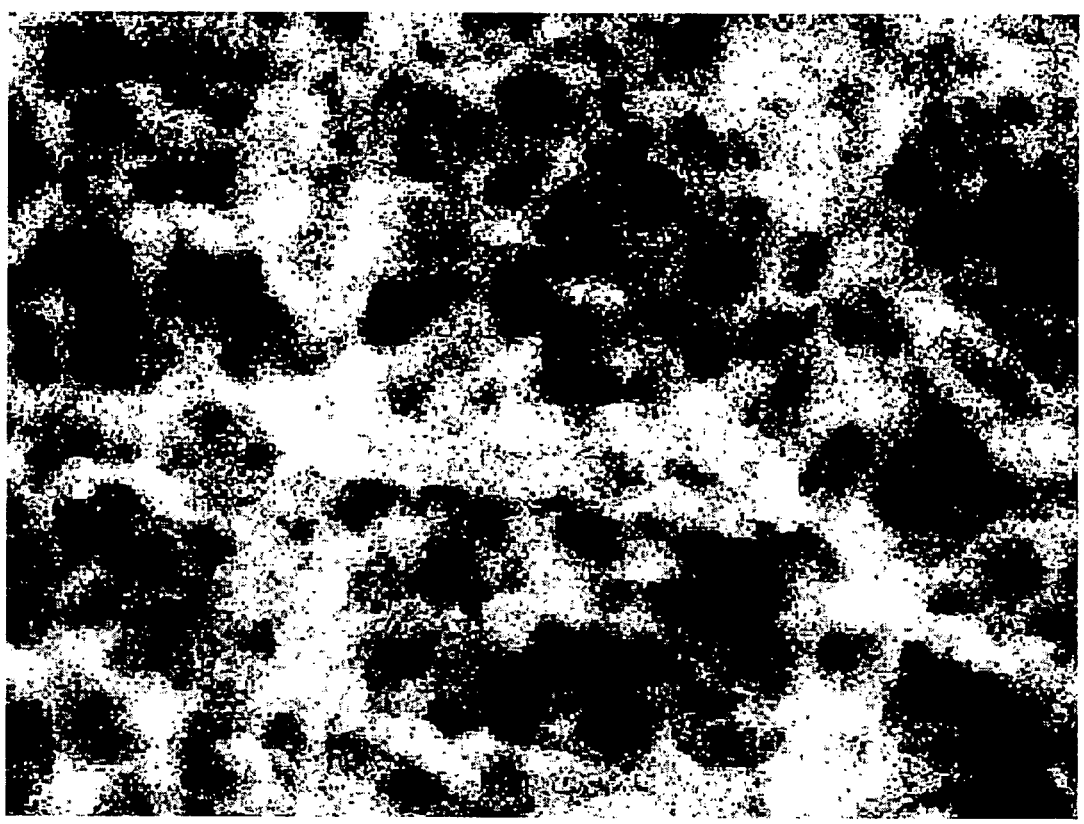
FIG. 19 is a black and white (ratio of black area) diagram showing an image gained by changing an SEM photograph of an anodic oxide coating in another example of the resin-metal bonded body according to the present invention.

At this time, the thickness of the anodic oxide coating 4 was 260 nm, the infrared absorption spectrum peak intensity ascribed to the OH group in the anodic oxide coating 4 was 0.035, and the ratio of the black area was 52.1% (FIG. 19).

Example 19

A resin-metal bonded body was manufactured in the same manner as in the above described Example 1, except that the refined sulfuric acid during the anodic oxidation process included 0.0006 mol/L of 1,3,5-triazine-2,4-dithiol-6-sodium thiolate (hereinafter referred to as TTN), an anodic oxide coating having triazine thiol inside and on top was formed, and no electrolytic polymerization process was carried out (FIGS. 1 and 2).

Figure 20:
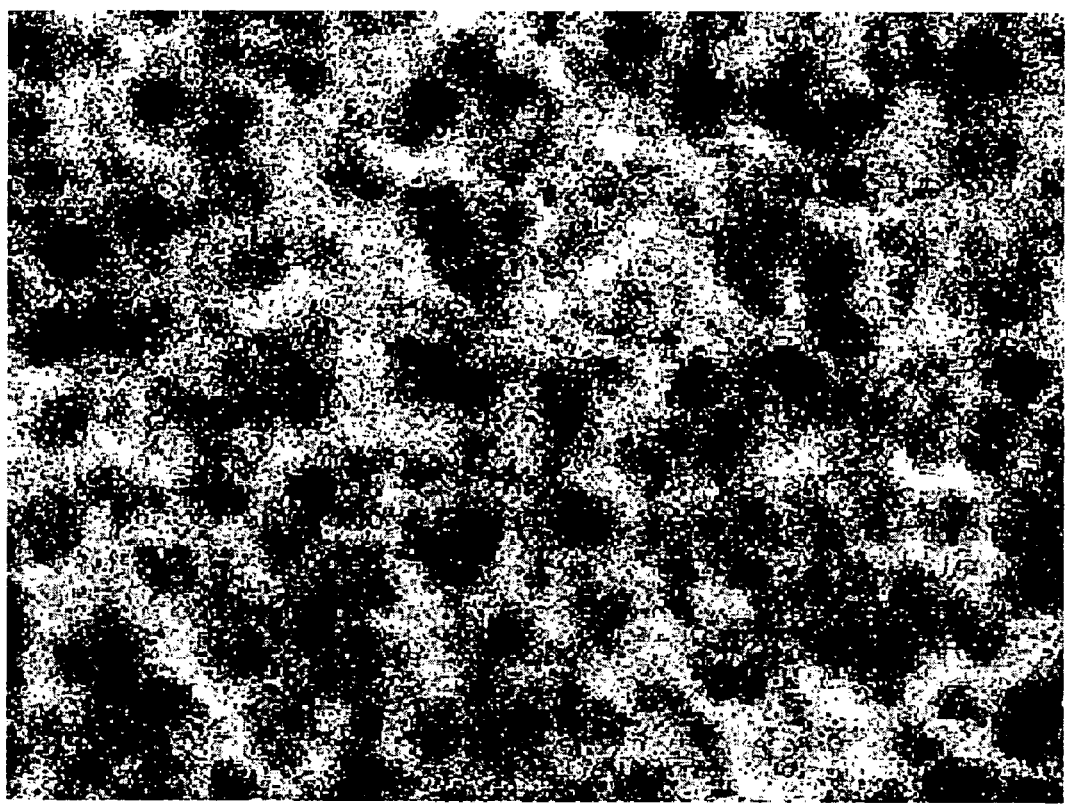
FIG. 20 is a black and white (ratio of black area) diagram showing an image gained by changing an SEM photograph of an anodic oxide coating in still another example of the resin-metal bonded body according to the present invention.

At this time, the thickness of the anodic oxide coating 4 was 220 nm, the infrared absorption spectrum peak intensity ascribed to the OH group in the anodic oxide coating 4 was 0.031, and the ratio of the black area was 51.3% (FIG. 20).

Example 20

A resin-metal bonded body was manufactured in the same manner as in the above described Example 1, except that no electrolytic polymerization process was carried out, the temperature of the refined sulfuric acid in the anodic oxidation process was 40° C., the time for electrolysis was 15 minutes, and the time for which the aluminum plate on which the anodic oxide coating was formed was washed with water (temperature: 50° C.) was 30 seconds (FIGS. 1 and 2).

Figure 21:
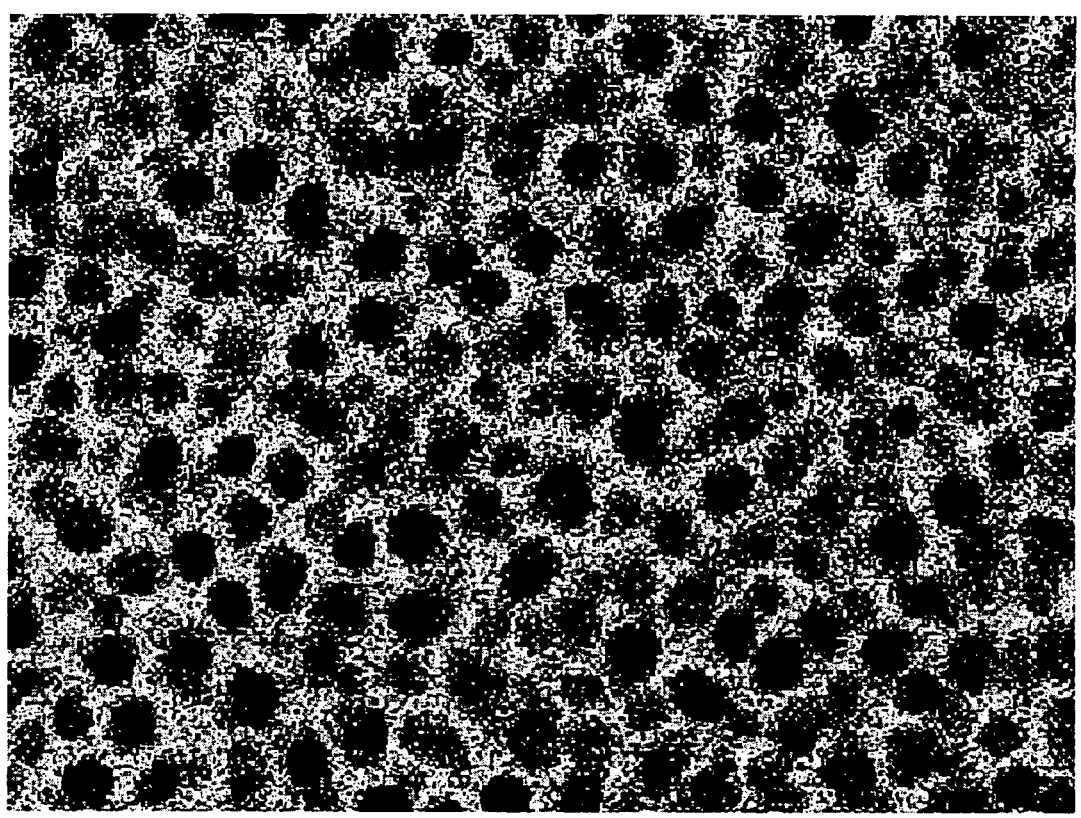
FIG. 21 is a black and white (ratio of black area) diagram showing an image gained by changing an SEM photograph of an anodic oxide coating in yet another example of the resin-metal bonded body according to the present invention.

At this time, the thickness of the anodic oxide coating 4 was 900 nm, the infrared absorption spectrum peak intensity ascribed to the OH group in the anodic oxide coating 4 was 0.1529, and the ratio of the black area was 56.2% (FIG. 21).

Example 21

A resin-metal bonded body was manufactured in the same manner as in the above described Example 20, except that the temperature of the refined sulfuric acid was 45° C. (FIGS. 1 and 2).

Figure 22:
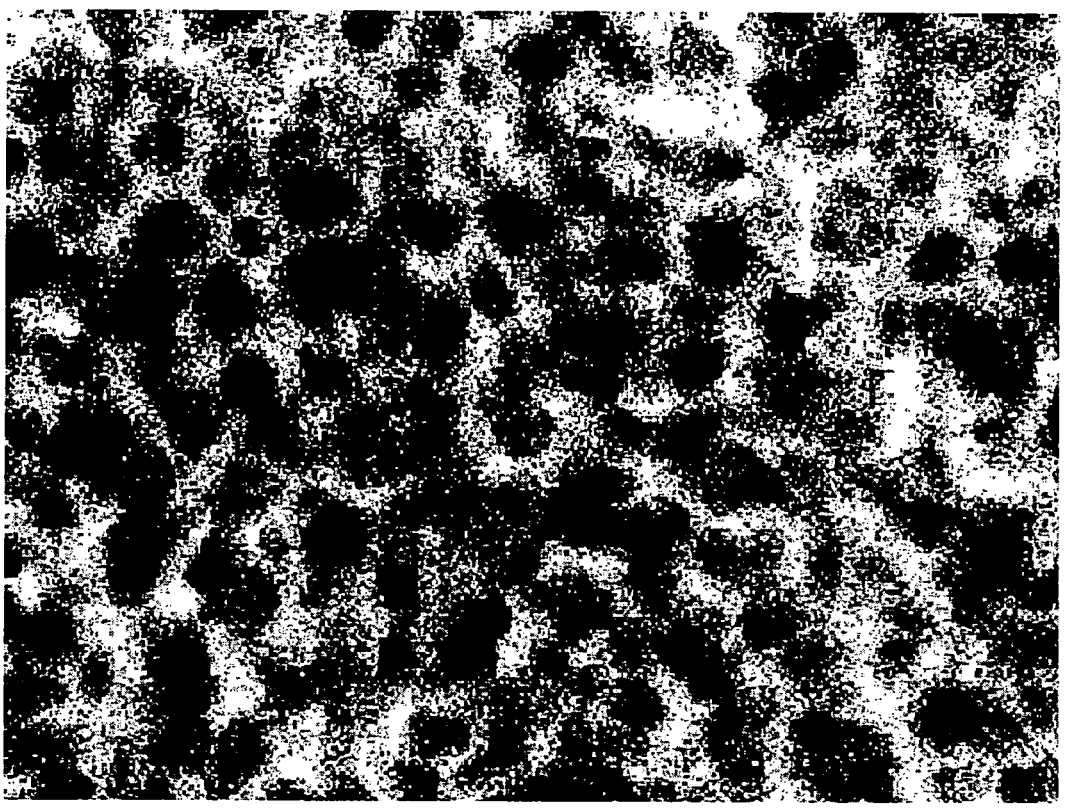
FIG. 22 is a diagram showing an image gained by changing an SEM photograph of an anodic oxide coating in another example of the resin-metal bonded body according to the present invention to black and white (ratio of black area)

At this time, the thickness of the anodic oxide coating 4 was 1400 nm, the infrared absorption spectrum peak intensity ascribed to the OH group in the anodic oxide coating 4 was 0.1456, and the ratio of the black area was 55.5% (FIG. 22).

Example 22

A resin-metal bonded body was manufactured in the same manner as in the above described Example 1, except that no electrolytic polymerization process was carried out, the time for electrolysis was 30 seconds in the above described anodic oxidation process, and the time for which the aluminum plate on which the anodic oxide coating was formed was washed with water (temperature: 50° C.) was 30 seconds (FIGS. 1 and 2).

Figure 23:
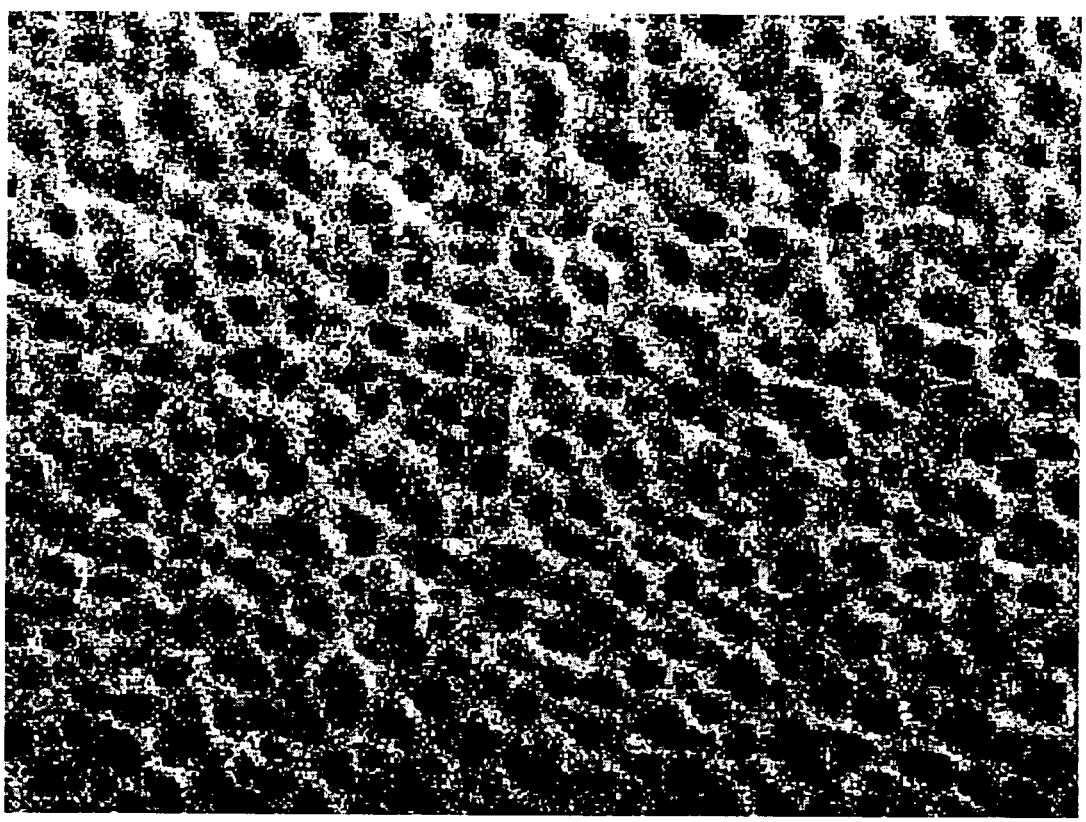
FIG. 23 is a black and white (ratio of black area) diagram showing an image gained by changing an SEM photograph of an anodic oxide coating in still another example of the resin-metal bonded body according to the present invention.

At this time, the thickness of the anodic oxide coating 4 was 80 nm, the infrared absorption spectrum peak intensity ascribed to the OH group in the anodic oxide coating 4 was 0.0066, and the ratio of the black area was 65.5% (FIG. 23).

Example 23

A resin-metal bonded body was manufactured in the same manner as in the above described Example 1, except that no electrolytic polymerization process was carried out, the time for electrolysis was 75 minutes in the above described anodic oxidation process, the current density was 0.02 A/dm$^2$, and the time for which the aluminum plate on which the anodic oxide coating was formed was washed with water (temperature: 50° C.) was 30 seconds (FIGS. 1 and 2).

Figure 24:
FIG. 24 is a black and white (ratio of black area) diagram showing an image gained by changing an SEM photograph of an anodic oxide coating in yet another example of the resin-metal bonded body according to the present invention.

At this time, the thickness of the anodic oxide coating 4 was 150 nm, the infrared absorption spectrum peak intensity ascribed to the OH group in the anodic oxide coating 4 was 0.0196, and the ratio of the black area was 61.8% (FIG. 24).

Example 24

A resin-metal bonded body was manufactured in the same manner as in the above described Example 1, except that no electrolytic polymerization process was carried out, The refined sulfuric acid in the above described anodic oxidation process was substituted with oxalic acid (concentration: 0.01 mol/L, first-class chemical made by Kanto Chemical Co., Inc.), the time for electrolysis was 15 minutes in the above described anodic oxidation process, and the time for which the aluminum plate on which the anodic oxide coating was formed was washed with water (temperature: 50° C.) was 30 seconds (FIGS. 1 and 2).

Figure 25:
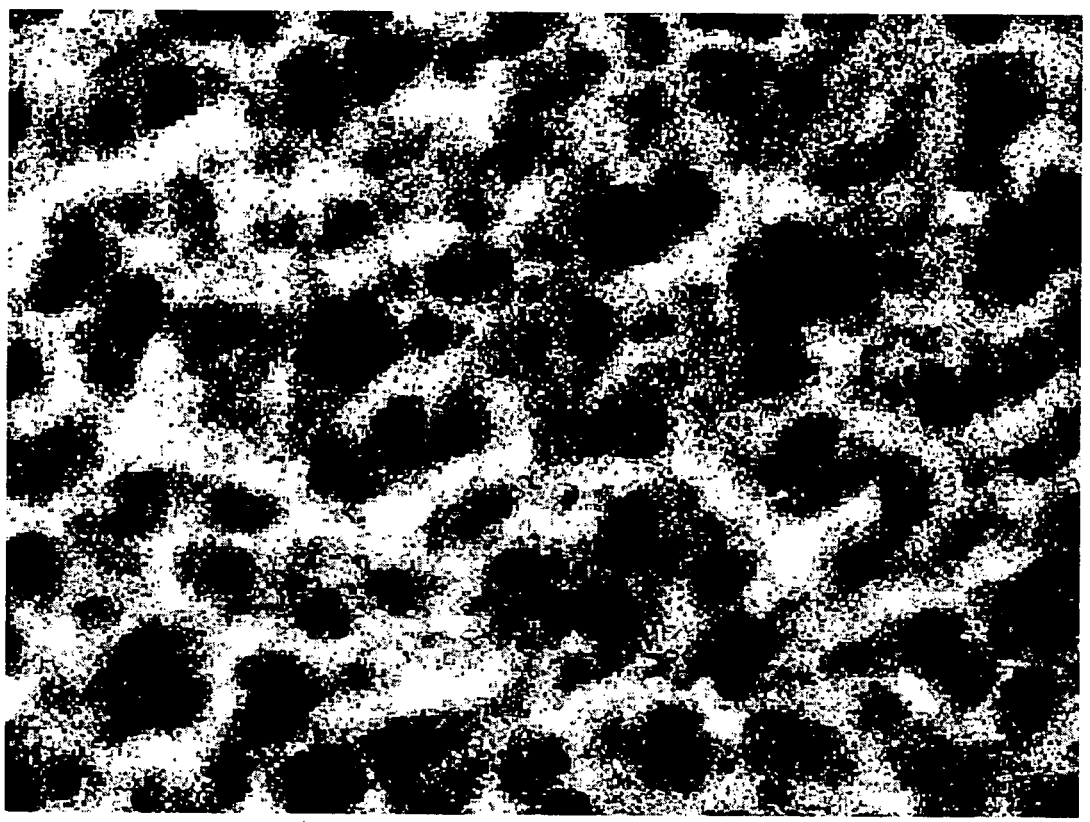
FIG. 25 is a black and white (ratio of black area) diagram showing an image gained by changing an SEM photograph of an anodic oxide coating in another example of the resin-metal bonded body according to the present invention.

At this time, the thickness of the anodic oxide coating 4 was 350 nm, the infrared absorption spectrum peak intensity ascribed to the OH group in the anodic oxide coating 4 was 0.0137, and the ratio of the black area was 54.9% (FIG. 25).

Example 25

A resin-metal bonded body was manufactured in the same manner as in the above described Example 24, except that the oxalic acid was substituted with a mixed acid of 0.01 mol/L of oxalic acid and 0.02 mol/L of sulfuric acid (FIGS. 1 and 2).

Figure 26:
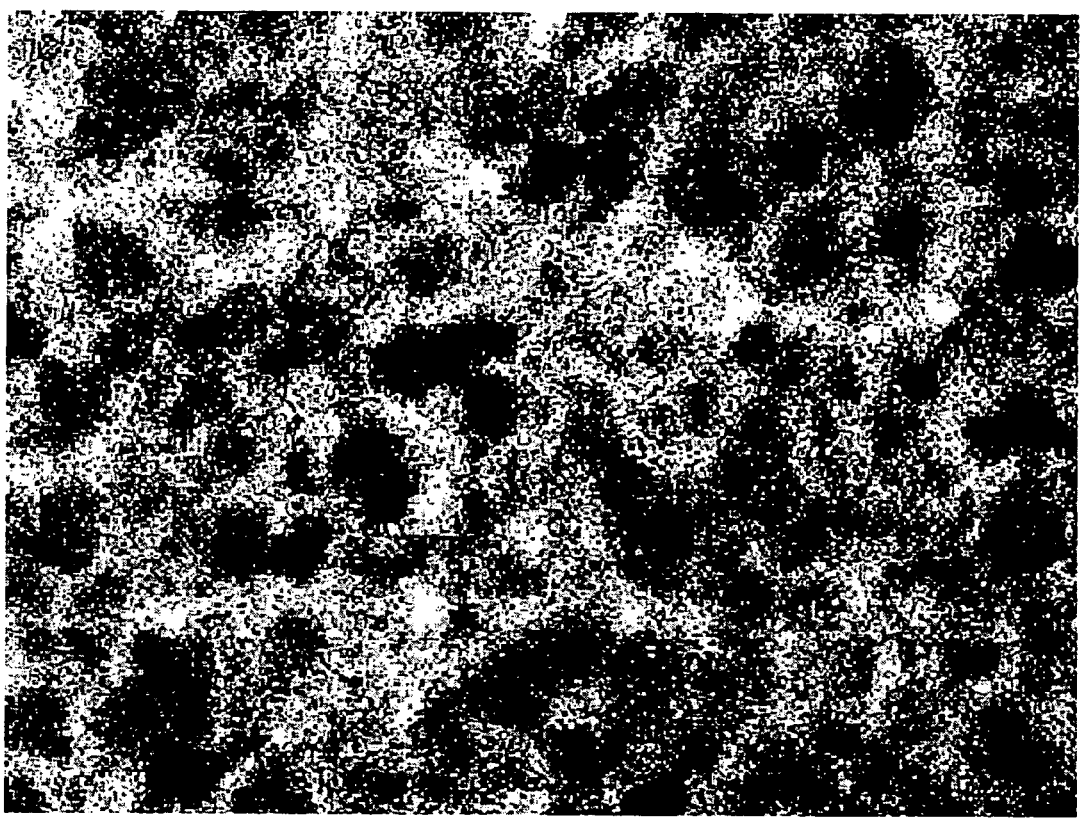
FIG. 26 is black and white (ratio of black area) a diagram showing an image gained by changing an SEM photograph of an anodic oxide coating in still another example of the resin-metal bonded body according to the present invention.

At this time, the thickness of the anodic oxide coating 4 was 230 nm, the infrared absorption spectrum peak intensity ascribed to the OH group in the anodic oxide coating 4 was 0.0151, and the ratio of the black area was 53.6% (FIG. 26).

Comparative Example 1

A resin-metal bonded body was manufactured in the same manner as in the above described Example 1, except that the temperature of the refined sulfuric acid solution in the above described anodic oxidation process was 30° C.

At this time, the thickness of the anodic oxide coating 4 was 990 nm and the infrared absorption spectrum peak intensity ascribed to the OH group in the anodic oxide coating 4 was 0.032.

Comparative Example 2

A resin-metal bonded body was manufactured in the same manner as in the above described Example 1, except that the current density in the above described anodic oxidation process was 0.01 A/dm$^2$.

At this time, the thickness of the anodic oxide coating 4 was 120 nm and the infrared absorption spectrum peak intensity ascribed to the OH group in the anodic oxide coating 4 was 0.035.

Comparative Example 3

A resin-metal bonded body was manufactured in the same manner as in the above described Example 1, except that the current density in the above described anodic oxidation process was 10 A/dm$^2$.

At this time, the thickness of the anodic oxide coating 4 was 300 nm and the infrared absorption spectrum peak intensity ascribed to the OH group in the anodic oxide coating 4 was 0.032.

Comparative Example 4

A resin-metal bonded body was manufactured in the same manner as in the above described Example 1, except that the temperature of the water for washing after the electrolytic polymerization process was 80° C. instead of 50° C.

Figure 8:
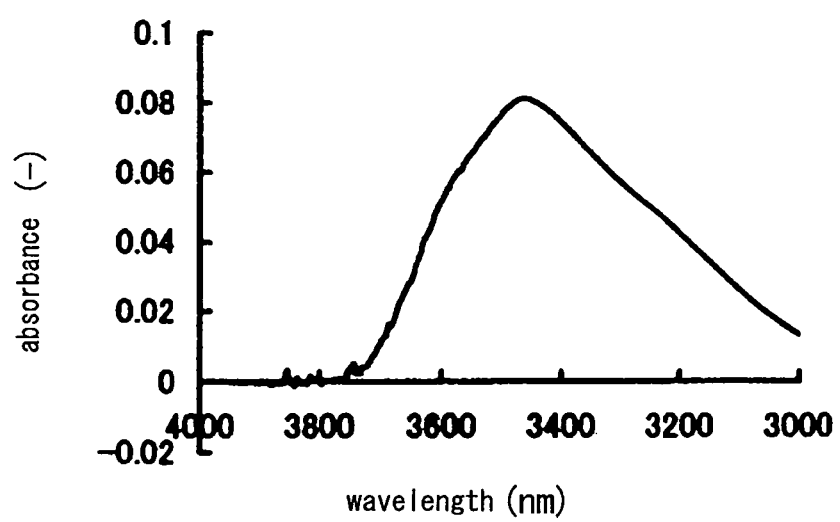
FIG. 8 is a graph showing the infrared absorption spectrum intensity ascribed to the OH group in the anodic oxide coating in an example of the resin-metal bonded body according to another invention.

At this time, the thickness of the anodic oxide coating 4 was 270 nm and the infrared absorption spectrum peak intensity ascribed to the OH group in the anodic oxide coating 4 was 0.08 (FIG. 8).

Comparative Example 5

A resin-metal bonded body was manufactured in the same manner as in the above described Example 1, except that the time for anodic electrolysis in the anodic oxidation process was 1 minute.

At this time, the thickness of the anodic oxide coating 4 was 20 nm and the infrared absorption spectrum peak intensity ascribed to the OH group in the anodic oxide coating 4 was 0.031.

Comparative Example 6

A resin-metal bonded body was manufactured in the same manner as in the above described Example 1, except that the temperature of the refined sulfuric acid solution in the above described anodic oxidation process was 95° C.

At this time, the thickness of the anodic oxide coating 4 was 140 nm and the infrared absorption spectrum peak intensity ascribed to the OH group in the anodic oxide coating 4 was 0.037.

Comparative Example 7

A resin-metal bonded body was manufactured in the same manner as in the above described Example 1, except that no electrolytic polymerization process was carried out, the time for electrolysis was 10 seconds in the anodic oxidation process, and the time for which the aluminum plate on which the anodic oxide coating was formed was washed with water (temperature: 50° C.) was 30 seconds (FIGS. 1 and 2).

Figure 27:
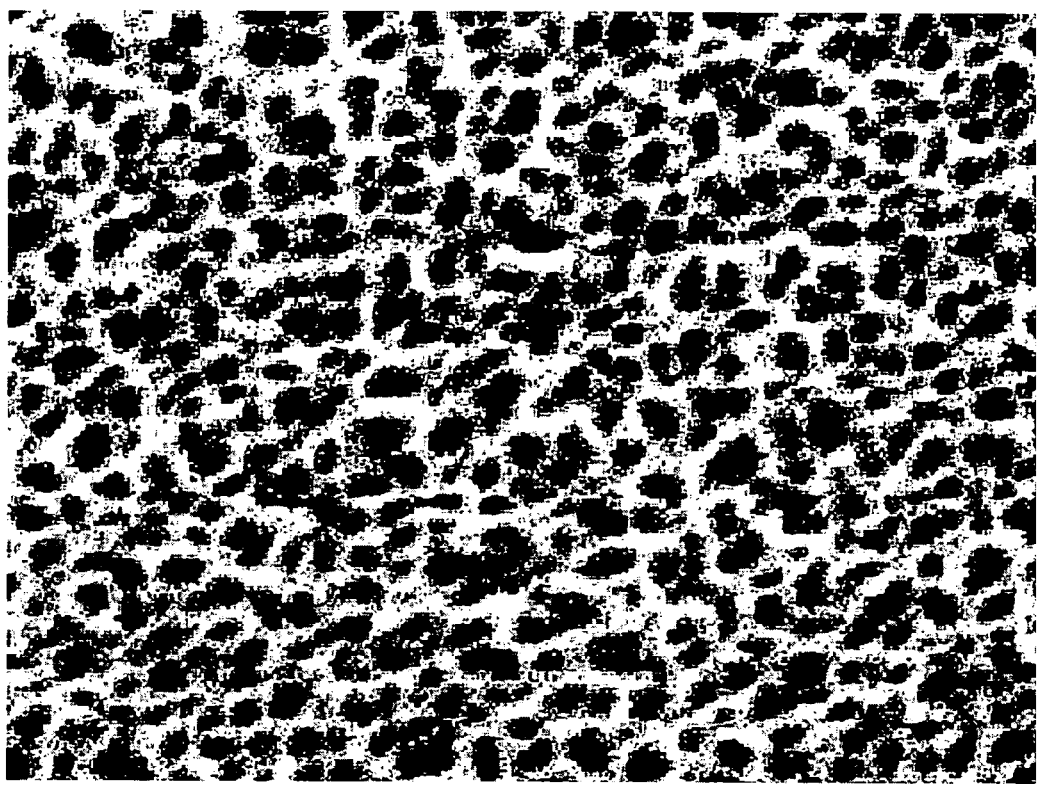
FIG. 27 is a black and white (ratio of black area) diagram showing an image gained by changing an SEM photograph of an anodic oxide coating in yet another example of the resin-metal bonded body according to outside of the present invention.

At this time, the thickness of the anodic oxide coating 4 was 50 nm, the infrared absorption spectrum peak intensity ascribed to the OH group in the anodic oxide coating 4 was 0.0031, and the ratio of the black area was 46.6% (FIG. 27).

Comparative Example 8

A resin-metal bonded body was manufactured in the same manner as in the above described Comparative Example 7, except that the temperature of the sulfuric acid in the anodic oxidation process was 48° C. and the time for electrolysis was 15 minutes (FIGS. 1 and 2)

Figure 28:
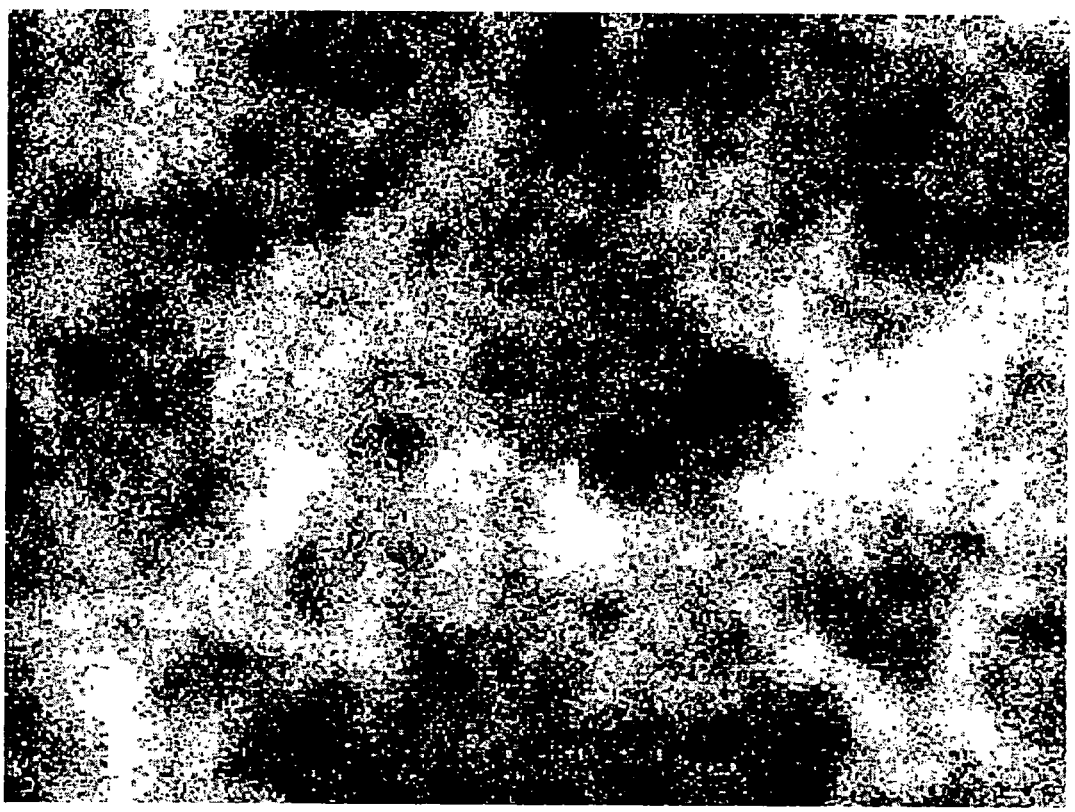
FIG. 28 is a black and white (ratio of black area) diagram showing an image gained by changing an SEM photograph of an anodic oxide coating in another example of the resin-metal bonded body according to outside of the present invention.

At this time, the thickness of the anodic oxide coating 4 was 1800 nm, the infrared absorption spectrum peak intensity ascribed to the OH group in the anodic oxide coating 4 was 0.1974, and the ratio of the black area was 45.9% (FIG. 28).

Test Examples

The strength of initial adhesion of the resin-metal bonded bodies gained in the above described Examples 1 to 25 and Comparative Examples 1 to 8, as well as the strength against high temperature and high humidity, were measured, and the results are shown in Table 1.

As concerns the evaluation of the strength in Table 1, samples having a strength of initial adhesion of 40 MPa or more and a strength of 30 MPa or more after the high temperature, high humidity test are indicated by ○, and those having a strength of adhesion of 40 MPa or more both initially and after the high temperature, high humidity test are indicated by ◎.

It is clear from the above Table 1 that the resin-metal bonded body according to the present invention can retain its high tensile strength over a long period of time as shown in the above strength test, and thus, firm bonding can be achieved, because there is an anodic oxide coating between the aluminum plate and the thermoplastic resin member.

Furthermore, a TTN coating can be provided with the resin bonded body according to the present invention during the electrolytic polymerization process, after the anodic oxide coating is formed during the anodic oxidation process and before the insert molding process, so that the strength of adhesion between the aluminum metal plate and the resin member can further be enhanced, so that high strength can be maintained over a long period of time.

Meanwhile, in the case where the temperature of the acidic solution in the electrolysis tank for forming an anodic oxide coating is outside a range of 35° C. to 90° C. and/or the current density is outside a range of 0.02 A/dm$^2$ to 2.5 A/dm$^2$, as in the comparative examples, the strength of adhesion of the gained anodic oxide coating is weak

TABLE 1

| | Electrolytic polymerization process carried out | Strength of initial adhesion (MPa) | Strength against high temperature and high humidity (MPa) | Evaluation | Thickness of anodic oxide coating (nm) | Peak intensity | Ratio of black area (%) |
|---|---|---|---|---|---|---|---|
| Example 1 | Yes | 47 | 42 | ◎ | 250 | 0.0320 | 53.1 |
| Example 2 | | 44 | 40 | ◎ | 650 | 0.0636 | — |
| Example 3 | | 51 | 45 | ◎ | 230 | 0.0310 | — |
| Example 4 | | 49 | 43 | ◎ | 200 | 0.0340 | 56.8 |
| Example 5 | | 45 | 40 | ◎ | 210 | 0.0320 | — |
| Example 6 | | 48 | 42 | ◎ | 270 | 0.0330 | — |
| Example 7 | | 47 | 42 | ◎ | 250 | 0.0300 | 54.1 |
| Example 8 | | 46 | 41 | ◎ | 280 | 0.0300 | 58.0 |
| Example 9 | | 43 | 42 | ◎ | 320 | 0.0260 | 54.4 |
| Example 10 | | 48 | 43 | ◎ | 240 | 0.0260 | 51.6 |
| Example 11 | | 46 | 42 | ◎ | 150 | 0.0300 | 55.7 |
| Example 12 | No | 46 | 35 | ○ | 290 | 0.0320 | 54.9 |
| Example 13 | | 43 | 32 | ○ | 700 | 0.0700 | — |
| Example 14 | | 48 | 40 | ◎ | 250 | 0.0340 | — |
| Example 15 | | 49 | 39 | ○ | 220 | 0.0310 | 55.5 |
| Example 16 | | 40 | 31 | ○ | 300 | 0.0300 | — |
| Example 17 | | 45 | 33 | ○ | 270 | 0.0330 | 55.1 |
| Example 18 | | 42 | 31 | ○ | 260 | 0.0350 | 52.1 |
| Example 19 | Same time as anode oxidation | 46 | 42 | ◎ | 220 | 0.0310 | 51.3 |
| Example 20 | No | 47 | 37 | ○ | 900 | 0.1529 | 56.2 |
| Example 21 | | 44 | 32 | ○ | 1400 | 0.1456 | 55.5 |
| Example 22 | | 41 | 32 | ○ | 80 | 0.0066 | 65.5 |
| Example 23 | | 40 | 32 | ○ | 150 | 0.0196 | 61.8 |
| Example 24 | | 44 | 41 | ◎ | 350 | 0.0137 | 54.9 |
| Example 25 | | 44 | 35 | ○ | 230 | 0.0151 | 53.6 |
| Comparative Example 1 | Yes | 18 | 10 | X | 990 | 0.0320 | — |
| Comparative Example 2 | | 31 | 22 | X | 120 | 0.0350 | — |
| Comparative Example 3 | | 31 | 21 | X | 300 | 0.0320 | — |
| Comparative Example 4 | | 33 | 21 | X | 270 | 0.0800 | — |
| Comparative Example 5 | | 28 | 20 | X | 20 | 0.0310 | — |
| Comparative Example 6 | | 35 | 25 | X | 140 | 0.0370 | — |
| Comparative Example 7 | No | 7 | — | X | 50 | 0.0031 | 46.6 |
| Comparative Example 8 | | 11 | — | X | 1800 | 0.1974 | 45.9 | between the aluminum plate and the thermoplastic resin member, and thus, sufficient strength for adhesion cannot be gained.

INDUSTRIAL APPLICABILITY

The resin-metal bonded body according to the present invention can be applied to any member where a resin and a metal are bonded together, particularly to lithium batteries, cellular phones, housings for personal computers and electronic parts.

The invention claimed is:
1. A method for producing a resin-metal bonded body, comprising:
   an anodic oxidation step of forming an anodic oxide coating having a coating thickness of 70-1500 nm on an aluminum metal member through electrolysis with a current density of 0.02 A/dm$^2$ or higher and less than 2.5 A/dm$^2$ in at least one of an acid solution selected from the group consisting of sulfuric acid, chromic acid, oxalic acid, and phosphoric acid at 50-90° C. using the aluminum metal member as an anode;
   a water washing step of washing the aluminum metal member with water at a temperature of 5° C. or higher and less than 60° C. so as to obtain an infrared absorption spectrum peak intensity of the anodic oxide coating ascribed to the OH group at 0.0001-0.16; and
   a step of insert molding a thermoplastic resin on the aluminum metal member after the water washing step, so that said aluminum metal member and the thermoplastic resin are bonded together only by the anodic oxide coating, to have a strength of initial adhesion of 40 MPa or more.

* * * * *